(12) United States Patent
Shah

(10) Patent No.: US 11,851,617 B2
(45) Date of Patent: Dec. 26, 2023

(54) PYROLYSIS REACTION SYSTEM AND METHOD OF PYROLYSING AN ORGANIC FEED

(71) Applicant: ROYAL MELBOURNE INSTITUTE OF TECHNOLOGY, Melbourne (AU)

(72) Inventor: Kalpit Shah, Melbourne (AU)

(73) Assignee: ROYAL MELBOURNE INSTITUTE OF TECHNOLOGY, Melbourne (AU)

( * ) Notice: Subject to any disclaimer, the term of this patent is extended or adjusted under 35 U.S.C. 154(b) by 135 days.

(21) Appl. No.: 17/058,760

(22) PCT Filed: May 30, 2019

(86) PCT No.: PCT/AU2019/050548
§ 371 (c)(1),
(2) Date: Nov. 25, 2020

(87) PCT Pub. No.: WO2019/227162
PCT Pub. Date: Dec. 5, 2019

(65) Prior Publication Data
US 2021/0207033 A1    Jul. 8, 2021

(30) Foreign Application Priority Data

May 30, 2018   (AU) ................................ 2018901918

(51) Int. Cl.
*C10B 49/22*    (2006.01)
*C10B 47/24*    (2006.01)
(Continued)

(52) U.S. Cl.
CPC .............. *C10B 49/22* (2013.01); *C10B 47/24* (2013.01); *C10B 49/10* (2013.01); *C10B 53/02* (2013.01);
(Continued)

(58) Field of Classification Search
CPC ....... C10J 3/58; C10J 3/64; C10J 3/482; C10J 3/485
See application file for complete search history.

(56) References Cited

U.S. PATENT DOCUMENTS 2,224,823 A * 12/1940 Klein ........................ C10B 1/04
  201/34
3,177,128 A * 4/1965 Vartanian ................ C01B 32/00
  202/121
(Continued)

FOREIGN PATENT DOCUMENTS

CN    107511391 A   12/2017
EP      0227550 A2    7/1987

OTHER PUBLICATIONS

Zhang H, Xiao R, Wang D, He G, Shao S, Zhang J, Zhong Z. Biomass fast pyrolysis in a fluidized bed reactor under N2, CO2, CO, CH4 and H2 atmospheres. Bioresource Technology, vol. 102, Issue 5, 2011, pp. 4258-4264, ISSN 0960-8524, https://doi.org/10.1016/j.biortech.2010.12.075.*

(Continued)

*Primary Examiner* — Jonathan Luke Pilcher
(74) *Attorney, Agent, or Firm* — Norris McLaughlin, P.A.

(57) ABSTRACT

The invention provides a pyrolysis reaction system, the system comprising: a pyrolysis chamber comprising a feed inlet, a gas inlet and a product outlet, wherein the pyrolysis chamber is configured i) to receive a pyrolysable organic feed and an inert gas via the feed inlet and gas inlet respectively, ii) to pyrolyse the organic feed at a pyrolysis temperature to produce a carbonaceous pyrolysis product and a pyrolysis gas, wherein the pyrolysis gas will combine with the inert gas to form a gas mixture having a pyrolysis chamber pressure in the pyrolysis chamber, and iii) to discharge the carbonaceous pyrolysis product via the product outlet; a gas reactor configured to react the pyrolysis gas (Continued)

by combustion and/or carbon deposition at a gas reaction temperature and a gas reactor pressure; and a first partition defining a boundary between the pyrolysis chamber and the gas reactor, the first partition comprising a plurality of first apertures to provide fluid communication between the pyrolysis chamber and the gas reactor, wherein the pyrolysis reaction system is operable with the gas reactor pressure less than the pyrolysis chamber pressure such that the gas mixture flows from the pyrolysis chamber to the gas reactor through the first apertures, thereby providing at least a portion of the pyrolysis gas for reaction in the gas reactor.

20 Claims, 22 Drawing Sheets

(51) Int. Cl.
  C10B 53/02  (2006.01)
  C10B 49/10  (2006.01)
  F23B 90/06  (2011.01)
  F23G 5/027  (2006.01)
  F23G 5/24   (2006.01)
(52) U.S. Cl.
  CPC .............. *F23B 90/06* (2013.01); *F23G 5/027* (2013.01); *F23G 5/245* (2013.01); *F23G 2201/303* (2013.01)

(56) References Cited

U.S. PATENT DOCUMENTS

| | | | | |
|---|---|---|---|---|
| 3,481,834 | A | * | 12/1969 | Squires .................. C10B 55/10 201/31 |
| 4,141,794 | A | | 2/1979 | Choi |
| 4,865,625 | A | * | 9/1989 | Mudge ..................... C10J 3/482 48/209 |
| 5,605,551 | A | * | 2/1997 | Scott ....................... C10B 49/10 201/37 |
| 2006/0163053 | A1 | * | 7/2006 | Ershag ................... C10B 47/16 202/109 |
| 2008/0098653 | A1 | | 5/2008 | Patil et al. |
| 2010/0037519 | A1 | | 2/2010 | Patil et al. |
| 2013/0097928 | A1 | | 4/2013 | Schwarz et al. |
| 2014/0338262 | A1 | | 11/2014 | Schwarz et al. |

OTHER PUBLICATIONS

International Search Report for corresponding application PCT/AU2019/050548 dated Aug. 15, 2019.
K. N. Dhavanath et al., "Derivation of optimum operating conditions for the slow pyrolysis of Mahua press seed cake in a fixed bed batch reactor for bio-oil production", Journal of Environmental Chemical Engineering, No. 5 (2017), pp. 4051-4063.
EP Search Report for corresponding application EP19810627.0 dated Feb. 2, 2022.
CN Office Action and English Translation for corresponding application CN 201980050180.5 dated Dec. 31, 2021.

* cited by examiner

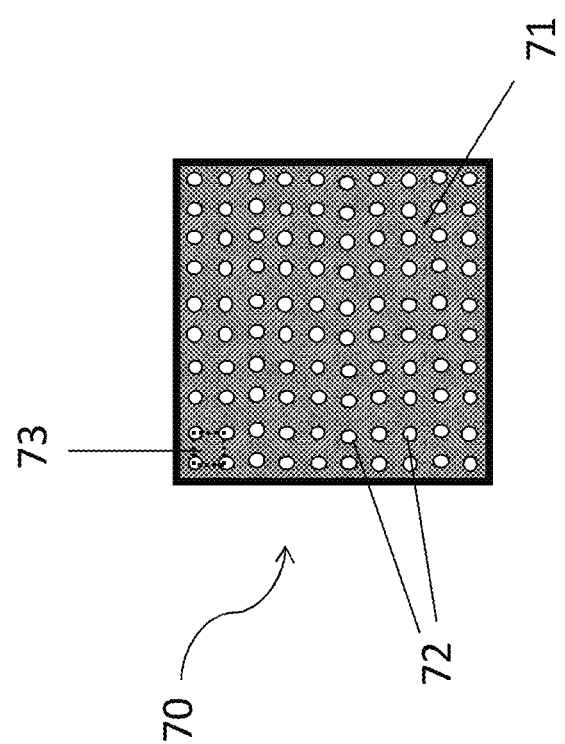

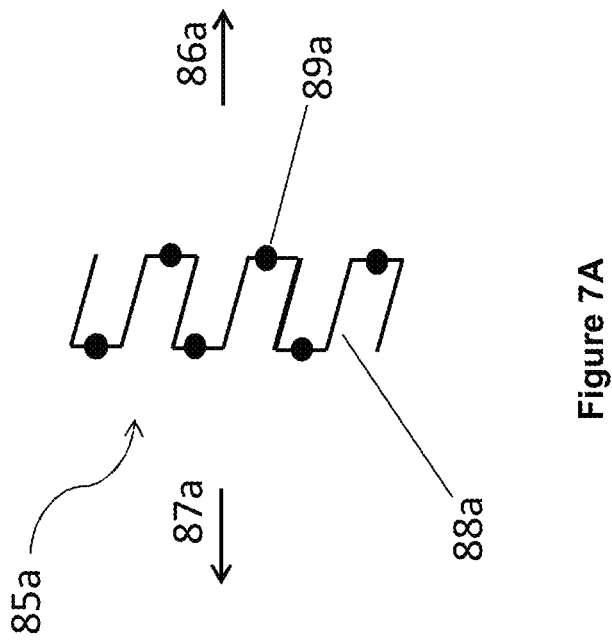
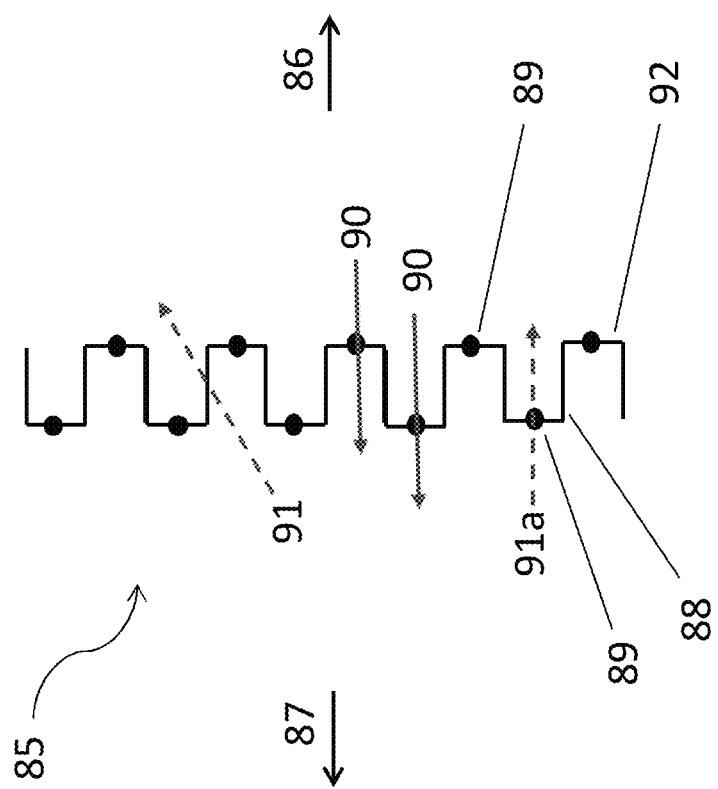

PYROLYSIS REACTION SYSTEM AND METHOD OF PYROLYSING AN ORGANIC FEED

This is an application filed under 35 USC 371 of PCT/AU2019/050548, filed 30 May 2019, which claims priority to AU 2018901918, filed 30 May 2018. The present application claims all priority benefits of the foregoing identified applications, as well as incorporating the entirety of their disclosures herein by reference thereto.

TECHNICAL FIELD

The invention relates to a pyrolysis reaction system and a method of pyrolysing an organic feed. The system comprises a pyrolysis chamber configured to pyrolyse an organic feed, a gas reactor configured to react the pyrolysis gas thus formed by combustion and/or carbon deposition, and a partition that defines a boundary between the pyrolysis chamber and the gas reactor. The partition includes a plurality of apertures, such that in use a gas mixture comprising the pyrolysis gas and an inert gas flows from the pyrolysis chamber, through the apertures, to the gas reactor for reaction.

BACKGROUND OF INVENTION

Pyrolysis is a high temperature decomposition process for converting a pyrolysable organic feed (i.e. any feed containing at least a portion of organic, carbon-based material) under substantially inert conditions, in particular where the oxygen content is sufficiently low that endothermic cracking reactions predominate over exothermic oxidation reactions. Low temperature pyrolysis (i.e. 300-350° C.) is called torrefaction, and is used for making charcoal from wood. The industrial pyrolysis normally operates at medium to high temperatures (350-750° C.) to produce products for energy, fuel or chemical applications. Pyrolysis of organic feed materials, including various waste and biomass sources, produces three product streams: a solid carbonaceous product (char), a pyrolysis oil fraction (which is liquid at ambient temperature) and a pyrolysis gas fraction (which is gaseous at ambient temperature and pressure).

Pyrolysis products such as gas, oil and char can be converted to a number of value-added products or can be used in their original form for a number of applications. For example, biochar produced from pyrolysis can be used for soil amendment, soil remediation, water purification, composites as well as fuel. The oil and gas fractions can be used as produced or further upgraded to be used as fuels.

Various pyrolysis reaction systems have been reported for conducting industrial pyrolysis reactions. Since pyrolysis is an endothermic reaction, it has previously been proposed to provide the required energy input at least in part by sacrificial combustion of one or more of the pyrolysis product fractions. This is typically done by diverting a portion of the hot pyrolysis gas product (comprising the vaporized oil and/or gas fractions) to a combustion reactor adjacent to the pyrolysis chamber, as schematically depicted in FIGS. 1 and 1A. Heat of combustion is thus transferred via conduction to the pyrolysis chamber from an external combustion reactor, as in a shell-and-tube heat exchanger arrangement, to provide the heat input necessary to drive pyrolysis.

However, the heat transfer in such systems may be unsatisfactory, particularly in larger scale reactor systems, resulting in poor heat distribution and thus low rates of pyrolysis and/or poor or inconsistent quality of char products.

In other reported pyrolysis reaction systems, the pyrolysable feed is thermally reacted in a gas atmosphere comprising controlled amounts and/or distributions of oxygen, such that both endothermic pyrolysis and exothermic combustion or gasification reactions takes place in the pyrolysis chamber. While this may address temperature control issues in the pyrolysis chamber, the resulting carbonaceous products may be unsatisfactory for many applications, such as in biochar production, as a result of the combustion reactions taking place.

There is therefore an ongoing need for new pyrolysis reaction systems and methods of pyrolysing organic feeds, which at least partially address one or more of the above-mentioned short-comings, or provide a useful alternative.

A reference herein to a patent document or other matter which is given as prior art is not to be taken as an admission that the document or matter was known or that the information it contains was part of the common general knowledge as at the priority date of any of the claims.

SUMMARY OF INVENTION

In accordance with a first aspect the invention provides a pyrolysis reaction system, the system comprising:

a pyrolysis chamber comprising a feed inlet, a gas inlet and a product outlet, wherein the pyrolysis chamber is configured i) to receive a pyrolysable organic feed and an inert gas via the feed inlet and gas inlet respectively, ii) to pyrolyse the organic feed at a pyrolysis temperature to produce a carbonaceous pyrolysis product and a pyrolysis gas, wherein the pyrolysis gas will combine with the inert gas to form a gas mixture having a pyrolysis chamber pressure in the pyrolysis chamber, and iii) to discharge the carbonaceous pyrolysis product via the product outlet;

a gas reactor configured to react the pyrolysis gas by combustion and/or carbon deposition at a gas reaction temperature and a gas reactor pressure; and a first partition defining a boundary between the pyrolysis chamber and the gas reactor, the first partition comprising a plurality of first apertures to provide fluid communication between the pyrolysis chamber and the gas reactor, wherein the pyrolysis reaction system is operable with the gas reactor pressure less than the pyrolysis chamber pressure such that the gas mixture flows from the pyrolysis chamber to the gas reactor through the first apertures, thereby providing at least a portion of the pyrolysis gas for reaction in the gas reactor In some embodiments, the gas reactor pressure is less than the pyrolysis chamber pressure by at least 0.05 bar, such as by at least 0.1 bar, or at least 1 bar.

In some embodiments, the partition is configured such that in operation the gas mixture flows through the first apertures at a flow rate sufficient to substantially preclude ingress of gas from the gas reactor into the pyrolysis chamber.

In some embodiments, the first apertures comprise at least 50%, such as from about 80% to about 90%, of a boundary area of the first partition between the gas reactor and the pyrolysis chamber. In some embodiments, the first partition comprises a mesh or perforated screen, in which the first apertures are formed.

In some embodiments, the partition is configured such that heat convects from the gas reactor to the pyrolysis chamber through the first apertures when the gas reaction temperature is greater than the pyrolysis temperature in operation, thereby providing at least a portion of the heat of pyrolysis in the pyrolysis chamber.

In some embodiments, the first partition comprises a thermally conductive material, preferably a metal, such that heat conducts from the gas reactor to the pyrolysis chamber through the thermally conductive material when the gas reaction temperature is greater than the pyrolysis temperature in operation, thereby providing another portion of the heat of pyrolysis in the pyrolysis chamber.

In some embodiments, the partition comprises a plurality of protruding members, such as tubes or fins, that extend into the gas reactor and/or the pyrolysis chamber, wherein at least a fraction of the first apertures are located on the protruding members. In some embodiments, the partition comprises a plurality of spaced apart sheet members, such as plates or meshes, that extend at least partially in a transverse orientation between the gas reactor and the pyrolysis chamber, wherein at least a fraction of the first apertures are located between the spaced apart sheet members. Such arrangements are believed to provide increased heat transfer area for transferring heat by conduction from the gas reactor to the pyrolysis chamber, when the gas reaction temperature is greater than the pyrolysis temperature in operation.

In some embodiments, the gas reactor comprises a port for introducing a gas containing oxygen, preferably air, and a duct for removing flue gas, wherein the gas reactor is configured such that in operation the pyrolysis gas will react by combustion with the oxygen. Such combustion may provide the heat transferred to the pyrolysis chamber by convection and/or conduction.

In some such embodiments, the gas reactor comprises an annulus surrounding the pyrolysis chamber and the port is configured to introduce the gas containing oxygen tangentially into the gas reactor such that a vortex flow around the pyrolysis chamber is produced in at least a part of the annulus.

In some embodiments, the pyrolysis reaction system further comprises a flow regulator for regulating the flow rate of the gas containing oxygen into the gas reactor in response to one or more temperature measurements in the pyrolysis chamber. Thus, the pyrolysis reaction temperature may be controlled within a predetermined target range by regulating the extent of combustion occurring in the gas reactor.

In some embodiments, the pyrolysis reaction system further comprises a secondary combustion reactor coupled to the duct of the gas reactor, the secondary combustion reactor configured such that in operation unreacted pyrolysis gas present in the flue gas will react by combustion with oxygen co-fed into the secondary combustion reactor.

In some such embodiments, the pyrolysis reaction system further comprises a heat exchanger at least partially disposed inside the gas reactor, wherein in operation a working fluid, preferably water, is vaporised in the heat exchanger for power generation. Excess heat of combustion, beyond that required to provide the heat of pyrolysis in the pyrolysis chamber, may thus be converted to electrical power.

In some embodiments, the gas reactor is configured such that in operation the pyrolysis gas will react by carbon deposition on a catalyst in the gas reactor, thereby forming a carbonaceous deposition product. The gas reactor may further comprise a catalyst feed inlet for feeding a particulate catalyst and a product discharge port for discharging a carbonaceous deposition product.

In some such embodiments, the pyrolysis reaction system further comprises: a combustion reactor comprising a port for introducing a gas containing oxygen, preferably air, and a duct for removing flue gas, wherein the combustion reactor is configured to combust a fuel with the oxygen at a combustion temperature; and a second partition defining a boundary between the combustion reactor and at least the gas reactor, wherein the second partition is configured such that heat of combustion transfers from the combustion reactor to the gas reactor through the second partition when the combustion temperature is greater than the gas reaction temperature in operation, thereby providing at least a portion of the heat of carbon deposition in the gas reactor. The combustion may thus produce a sufficiently high temperature in the gas reactor to provide heat transfer from the gas reactor to the pyrolysis chamber by convection and/or conduction.

In some such embodiments, the second partition comprises a plurality of second apertures to provide fluid communication between the combustion reactor and the gas reactor, wherein in operation: i) a portion of the pyrolysis gas flows from the gas reactor to the combustion reactor through the second apertures, wherein the fuel combusted in the combustion chamber comprises the portion of the pyrolysis gas; and ii) the heat of combustion transferred through the second partition at least partially convects through the second apertures.

In some such embodiments, the second apertures comprise at least 50%, such as from about 80% to about 90%, of a boundary area of the second partition between the gas reactor and the combustion reactor.

In some such embodiments, the pyrolysis chamber is configured to discharge the carbonaceous pyrolysis product into the combustion reactor, wherein the fuel combusted in the combustion chamber in operation comprises the carbonaceous pyrolysis product.

In some such embodiments, the duct passes through the gas reactor to heat the catalyst with the flue gas.

In some such embodiments, the second partition further defines a boundary between the combustion reactor and the pyrolysis chamber, wherein heat of combustion transfers from the combustion reactor through the second partition to the pyrolysis chamber in operation.

In some embodiments, the first partition forms a peripheral boundary, preferably a cylindrical boundary, around the pyrolysis chamber and the gas reactor surrounds the peripheral boundary. In some embodiments, the first partition is rotatable relative to the gas reactor.

In some embodiments, the pyrolysis chamber is configured to fluidise solids comprising the organic feed and/or the carbonaceous pyrolysis product with the inert gas. In some embodiments, a flue gas produced by combustion of the pyrolysis gas in the pyrolysis reaction system is directed to form at least a portion of the inert gas.

In accordance with a second aspect, the invention provides a method of pyrolysing an organic feed, the method comprising:

feeding a pyrolysable organic feed and an inert gas to a pyrolysis chamber;

pyrolysing the organic feed at a pyrolysis temperature to produce a carbonaceous pyrolysis product and a pyrolysis gas, wherein the pyrolysis gas combines with the inert gas in the pyrolysis chamber to form a gas mixture having a pyrolysis chamber pressure;

discharging the carbonaceous pyrolysis product from the pyrolysis chamber;

flowing the gas mixture to a gas reactor through a plurality of first apertures in a first partition, wherein the first partition defines a boundary between the pyrolysis chamber and the gas reactor; and reacting the pyrolysis gas in the gas reactor by combustion and/or carbon deposition at a gas reaction temperature and a gas reactor pressure, wherein the gas reactor pressure is less than the pyrolysis chamber pressure.

In some embodiments, the gas reactor pressure is less than the pyrolysis chamber pressure by at least 0.05 bar, such as by at least 0.1 bar, or at least 1 bar.

In some embodiments, the pyrolysis temperature is between about 250° C. and about 750° C., such as between 400° C. and 750° C.

In some embodiments, the gas mixture flows through the first apertures at a flow rate sufficient to substantially preclude ingress of a gas from the gas reactor into the pyrolysis chamber.

In some embodiments, the gas reaction temperature is greater than the pyrolysis temperature, wherein heat convects from the gas reactor to the pyrolysis chamber through the first apertures, thereby providing at least a portion of the heat of pyrolysis in the pyrolysis chamber. In some such embodiments, the gas reaction temperature is greater than the pyrolysis temperature by at least about 100° C.

In some embodiments, the method further comprises introducing a gas containing oxygen, such as air, into the gas reactor and reacting the pyrolysis gas by combustion with the oxygen.

In some such embodiments, the method further comprises regulating the flow rate of the gas containing oxygen into the gas reactor in response to one or more temperatures measured in the pyrolysis chamber, thereby maintaining the temperatures within predetermined target ranges.

In some such embodiments, the method further comprises removing flue gas from the gas reactor and combusting unreacted pyrolysis gas present in the flue gas in a secondary combustion reactor with oxygen co-fed into the secondary combustion reactor.

In some embodiments, the method further comprises reacting the pyrolysis gas by carbon deposition on a catalyst in the gas reactor, thereby forming a carbonaceous deposition product.

In some such embodiments, the gas reaction temperature for carbon deposition is between about 600° C. and about 800° C. In some such embodiments, the method further comprises feeding a particulate catalyst to the gas reactor, and discharging the carbonaceous deposition product from the gas reactor.

In some such embodiments, the method further comprises combusting a fuel with oxygen in a combustion reactor at a combustion temperature greater than the gas reaction temperature, wherein heat of combustion transfers from the combustion reactor to the gas reactor through a second partition that defines a boundary between the combustion reactor and at least the gas reactor, thereby providing at least a portion of the heat of carbon deposition in the gas reactor.

In some such embodiments, the second partition comprises a plurality of second apertures providing fluid communication between the combustion reactor and the gas reactor, wherein: i) a portion of the pyrolysis gas flows from the gas reactor to the combustion reactor through the second apertures, wherein the fuel combusted in the combustion chamber comprises the portion of the pyrolysis gas; and ii) the heat of combustion transferred through the second partition at least partially convects through the second apertures.

In some such embodiments, gas flows through the second apertures at a flow rate sufficient to substantially preclude ingress of oxygen from the combustion reactor into the gas reactor.

In some such embodiments, the carbonaceous pyrolysis product is discharged into the combustion reactor, wherein the fuel combusted in the combustion chamber comprises the carbonaceous pyrolysis product.

In some embodiments, the inert gas comprises a flue gas produced by combustion of the pyrolysis gas. In some embodiments, the pyrolysable organic feed comprises biomass. In some embodiments, the heat of pyrolysis is provided by combustion of the pyrolysis gas and/or the carbonaceous pyrolysis product without external energy input.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", and "second" in relation to various features of the disclosed devices are arbitrarily assigned and are merely intended to differentiate between two or more such features that the device may incorporate in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which:

FIG. 5 schematically depicts a plan view of a perforated screen partition that defines a boundary between the pyrolysis chamber and the gas reactor in some embodiments of the invention.

FIGS. 7 and 7A schematically depict side views of finned partitions that define a boundary between the pyrolysis chamber and the gas reactor in some embodiments of the invention, in which the protruding fin members are oriented horizontally and at an inclination respectively.

FIGS. 15 and 15A schematically depict a side view and plan view of pyrolysis reaction system 700 according to another embodiment of the invention, in which the gas reactor adjacent to the pyrolysis chamber is a primary combustion reactor, a remote secondary combustion reactor is further provided to complete the combustion, and in which the system produces biochar product.

DETAILED DESCRIPTION

The present invention relates to a pyrolysis reaction system. The system comprises a pyrolysis chamber configured to receive a pyrolysable organic feed via a feed inlet and an inert gas via a gas inlet, and to pyrolyse the organic feed in the presence of the inert gas to produce a carbonaceous pyrolysis product and a pyrolysis gas. The pyrolysis gas will thus combine with the inert gas to form a gas mixture in the pyrolysis chamber. The pyrolysis chamber is configured to discharge the solid carbonaceous pyrolysis product via a product outlet.

The system further comprises a gas reactor configured to react the pyrolysis gas by combustion and/or carbon deposition. A partition defines a boundary between the pyrolysis chamber and the gas reactor, with the partition including a plurality of apertures to provide fluid communication between the pyrolysis chamber and the gas reactor.

In operation, the gas mixture flows through the apertures from the pyrolysis chamber to the gas reactor as a result of the higher pressure maintained in the pyrolysis chamber, thereby providing at least a portion of the pyrolysis gas for reaction in the gas reactor. In preferred embodiments, the partition is configured such that, when the temperature in the gas reactor is higher than the temperature in the pyrolysis chamber, heat transfers from the gas reactor to the pyrolysis chamber at least in part by convection through the apertures, thereby providing at least a portion of the heat of pyrolysis in the pyrolysis chamber. The heat transferred by convection through the apertures may supplement heat conducted through the partition that provides another portion of the heat of pyrolysis in the pyrolysis chamber.

The present invention also relates to a method of pyrolysing an organic feed, for example in a pyrolysis system as described herein. The method comprises feeding a pyrolysable organic feed and an inert gas to a pyrolysis chamber, and pyrolysing the organic feed to produce a solid carbonaceous pyrolysis product and a pyrolysis gas. The carbonaceous pyrolysis product is discharged from the pyrolysis chamber, and the pyrolysis gas combines with the inert gas to form a gas mixture in the pyrolysis chamber. This gas mixture flows to a gas reactor through a plurality of apertures in a partition that defines a boundary between the pyrolysis chamber and the gas reactor, due to the higher pressure maintained in the pyrolysis chamber. The pyrolysis gas reacts in the gas reactor by combustion and/or carbon deposition.

In preferred embodiments, the temperature is greater in the gas reactor than in the pyrolysis chamber, and heat is transferred from the gas reactor to the pyrolysis chamber at least in part by convection through the first apertures, thereby providing at least a portion of the heat of pyrolysis in the pyrolysis chamber.

Figure 1A:
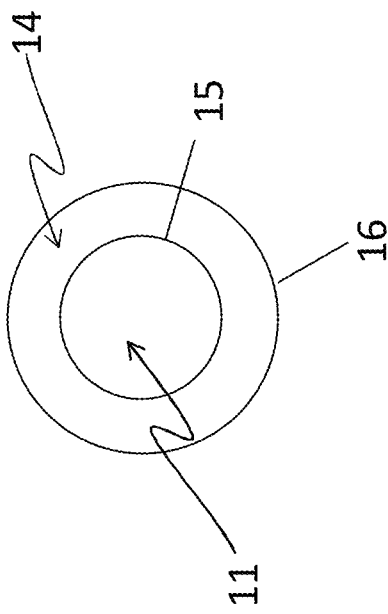
FIGS. 1 and 1A schematically depict side and plan views of a pyrolysis reaction system operating according to principles disclosed in the prior art.

The features and advantages of the invention may be better understood with an appreciation of the operating principles of certain prior art pyrolysis systems. Pyrolysis system 10, which operates according to previously disclosed principles, is therefore schematically depicted in FIG. 1. Pyrolysis system 10 comprises pyrolysis chamber 11, configured to receive a pyrolysable organic feed 12 and inert gas 13. Pyrolysis system 10 further includes combustion reactor 14 adjacent to pyrolysis chamber 11. Impermeable metal partition 15 defines a boundary between chamber 11 and combustion reactor 14. Pyrolysis chamber 11 is cylindrical, and the interior reaction zone of combustion reactor 14 is an annulus between outer walls 16 and cylindrical partition 15, as schematically depicted in side view in FIG. 1 and in plan view in FIG. 1A.

In use, organic feed 12 is fed to pyrolysis chamber 11 and pyrolyses at a temperature between 350° C. and 750° C. to produce pyrolysis gas (generally comprising components that on cooling would separate into gas and oil fractions) and solid carbonaceous pyrolysis products. The carbonaceous products are discharged from pyrolysis chamber 11. Pyrolysis gas 17 is withdrawn from chamber 11 and transported by external pipework for combustion in combustion reactor 14 with oxygen introduced via air stream 18. Flue gas 19 is directed to exhaust system 20. At least a portion of the heat of combustion is transferred from reactor 14 through metallic partition 15 by conduction, thereby driving the endothermic pyrolysis reaction in pyrolysis chamber 11.

Figure 2A:
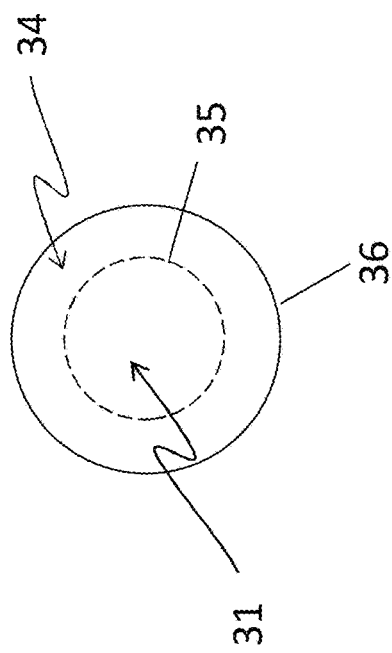
FIGS. 2 and 2A schematically depict side and plan views of pyrolysis reaction system 30 according to an embodiment of the invention, in which the gas reactor adjacent to the pyrolysis chamber is a combustion reactor.
Figure 2:
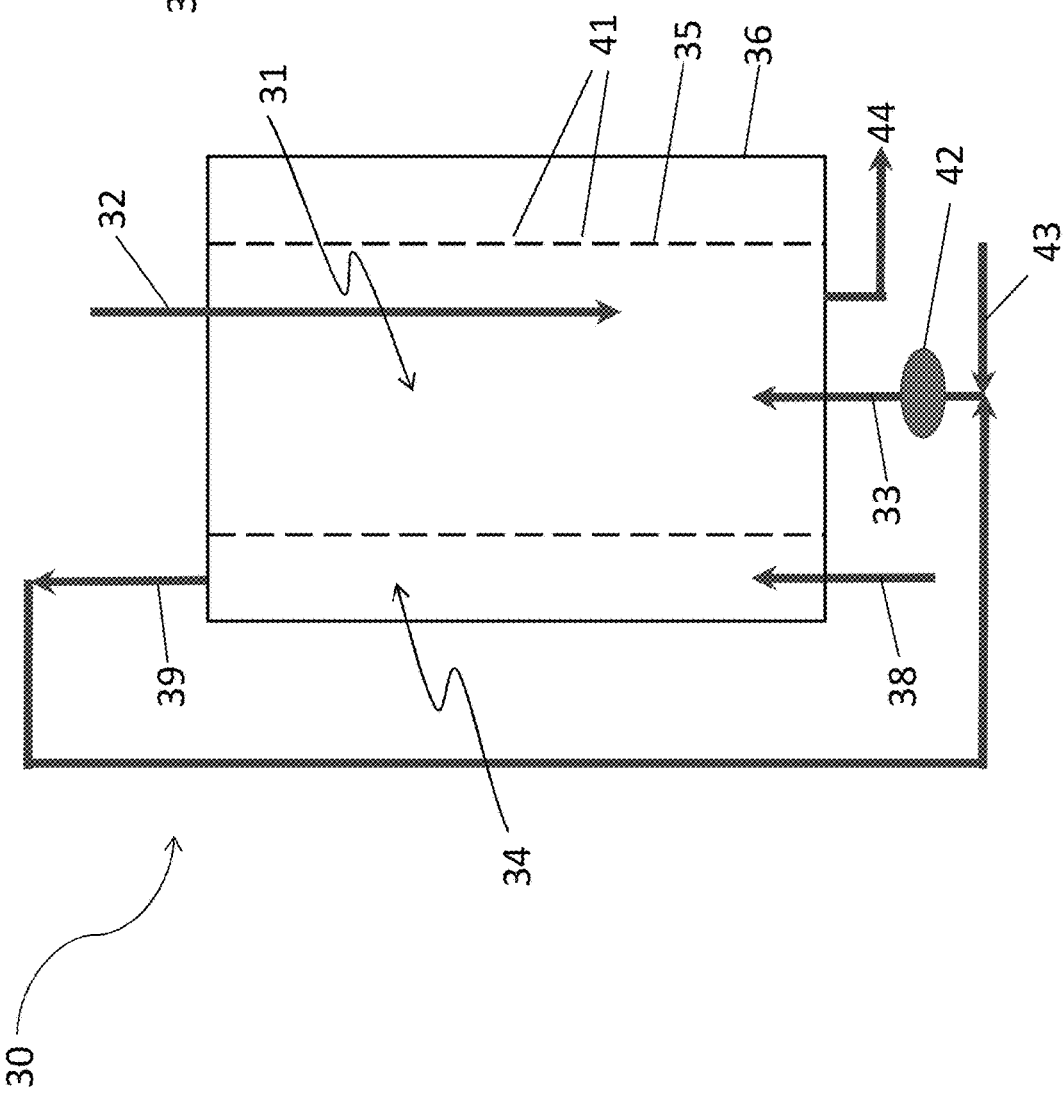
Figure 3:
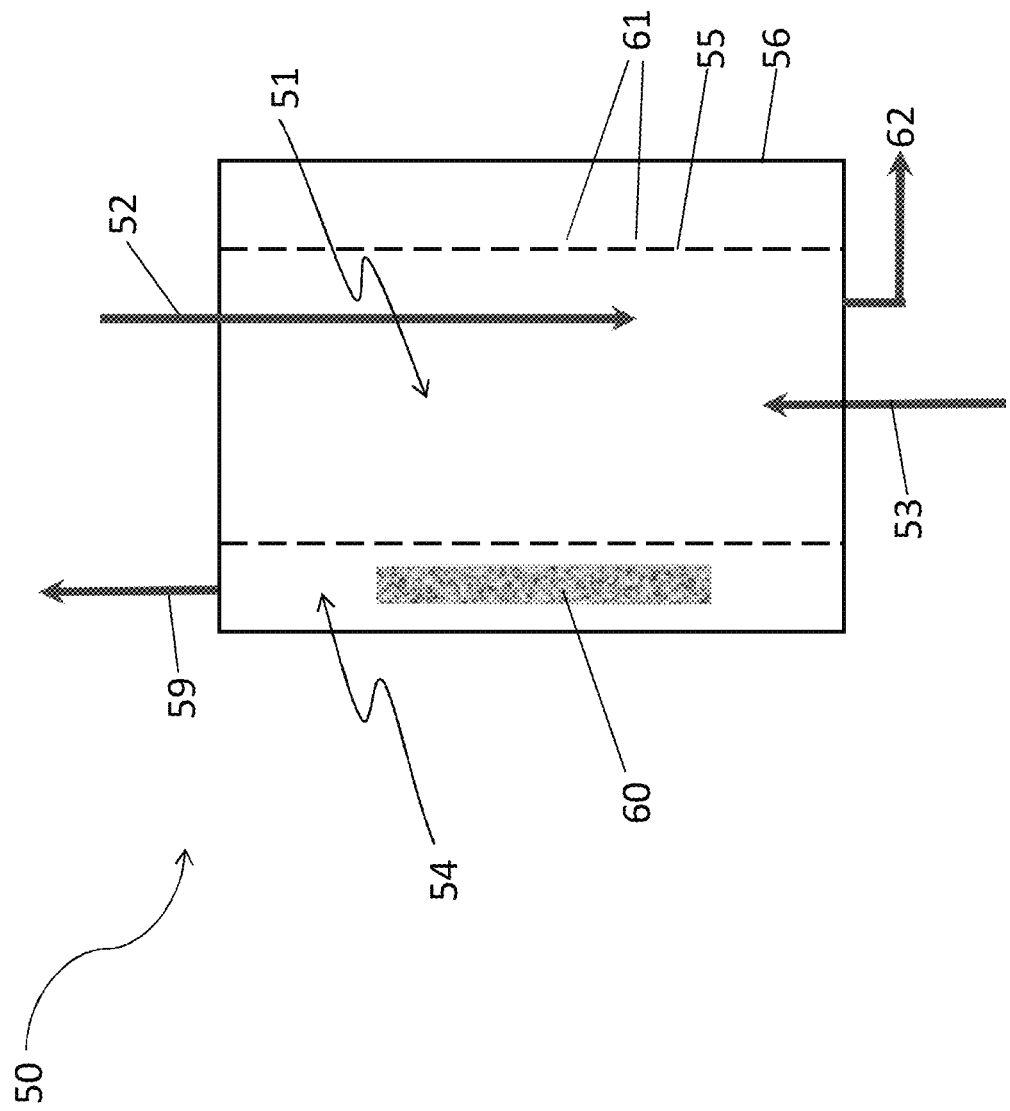
FIG. 3 schematically depicts a side view of pyrolysis reaction system 50 according to another embodiment of the invention, in which the gas reactor adjacent to the pyrolysis chamber is a carbon deposition reactor.

The present invention in its broadest form may be understood by considering pyrolysis systems 30 and 50, depicted in FIGS. 2 and 3 respectively. Pyrolysis system 30 comprises pyrolysis chamber 31, configured to receive a pyrolysable organic feed 32 and inert gas 33. Pyrolysis system 30 further includes gas reactor 34 adjacent to pyrolysis chamber 31. In system 30, gas reactor 34 is a combustion reactor. Partition 35 defines a boundary between chamber 31 and gas reactor 34. Optionally, pyrolysis chamber 31 is cylindrical, and the interior reaction zone of gas reactor 34 is an annulus between outer walls 36 and cylindrical partition 35, as schematically depicted in side view in FIG. 2 and in plan view in FIG. 2A. However, other adjacent reactor configurations may be adopted without departing from the scope of the invention.

Partition 35 is preferably made of a thermally conductive material (typically metal) and includes a plurality of apertures 41 providing fluid communication between pyrolysis chamber 31 and gas reactor 34.

In use, organic feed 32 is fed to pyrolysis chamber 31 and pyrolyses at a conventional pyrolysis temperature, such as between 350° C. and 750° C. (depending on the feed) in the presence of inert gas 33 to produce pyrolysis gas and solid carbonaceous pyrolysis products. The carbonaceous products are discharged from pyrolysis chamber 31 via product outlet 44. The pyrolysis gas combines with inert gas 33 to form a gas mixture in chamber 51.

This gas mixture flows through apertures 41 in partition 35 and combusts in gas reactor 34 in the presence of air 38. The resulting temperature in the combustion reaction zone is controlled to be greater than that in the pyrolysis reaction zone in chamber 31, typically by about 50 to 300° C., or 100 to 200° C. Partition 35, and in particular the distribution and size of apertures 41 therein, is configured such that a pressure differential is maintained between pyrolysis chamber 31 and gas reactor 34, and the resulting flow velocity of the gas mixture through the apertures is sufficient to prevent or suitably limit ingress of oxygen into pyrolysis chamber 34. It will be appreciated that complete exclusion of oxygen may not be required in all embodiments, provided that the oxygen content in pyrolysis chamber 34 is low enough to allow effective pyrolysis of the feed.

As a result of the higher temperature in gas reactor 34 due to combustion, heat is transferred in the opposite direction through partition 35, i.e. from gas reactor 34 to pyrolysis chamber 31. This heat transfer occurs both by conduction through the thermally conductive partition material and by convection through apertures 41, thereby providing at least a portion of the heat necessary to drive the endothermic pyrolysis reaction in chamber 31.

Heat transfer through partition 35 is highly efficient as a result of the combined convective and conductive heat transfer modes, as will be further described hereafter. Moreover, the heat of combustion transferred from gas reactor 34 is generally sufficient to provide the heat of pyrolysis in pyrolysis chamber 31, such that an external energy input into the process is not required.

Inert gas 33 may optionally include a portion of hot flue gas 39 withdrawn from combustion reactor 34, given the depletion of oxygen resulting from combustion. This may advantageously further improve transfer of the heat of combustion from combustion reactor 34 to pyrolysis chamber 31, and potentially obviate the need for an external supply of inert gas. Fan 42 (alternatively a blower or compressor) is used to pressurise inert gas feed 33 into chamber 31, thereby ensuring that the pressure in pyrolysis chamber 34 is suitably higher than in gas reactor 34. However, inert gas 33 may additionally, or alternatively, include at least a component of non-reactive gas 43, such as $N_2$ or $CO_2$. In the broadest conceptualisation of the invention, the composition and source of inert gas 33 is not considered to be particularly limited, provided that its oxygen content is suitably low to allow pyrolysis of the feed in chamber 31.

Pyrolysis system 50, schematically depicted in FIG. 3, comprises pyrolysis chamber 51, configured to receive a pyrolysable organic feed 52 and inert gas 53. Pyrolysis system 50 further includes gas reactor 54 adjacent to pyrolysis chamber 51. In the case of system 50, gas reactor 54 is a carbon deposition reactor, and thus contains catalyst (or catalyst based support material) 60 for catalysing the formation of carbonaceous deposition products, such as carbon fiber or carbon nanomaterials, from pyrolysis gas. As depicted in FIG. 3, catalyst 60 may be present on monolithic support. Alternatively, catalyst 60 may be a particulate catalyst which is fluidised or packed in gas reactor 54.

Partition 55 defines a boundary between chamber 51 and gas reactor 54. Pyrolysis chamber 51 and gas reactor 54 may optionally have cylindrical and annular reaction zones, respectively, as discussed herein for pyrolysis system 30. Partition 55 is preferably made of a thermally conductive material (typically metal) and includes a plurality of apertures 61 providing fluid communication between pyrolysis chamber 51 and gas reactor 54.

In use, organic feed 52 is fed to pyrolysis chamber 51 and pyrolyses at a conventional pyrolysis temperature in the presence of inert gas 53 to produce pyrolysis gas and solid carbonaceous pyrolysis products. The carbonaceous products are discharged from pyrolysis chamber 51 via product outlet 62. The pyrolysis gas combines with inert gas 53 to form a gas mixture.

This gas mixture flows through apertures 61 in partition 55, and the pyrolysis gas therein reacts on catalyst 60 to form carbonaceous deposition products. The temperature in the carbon deposition reaction zone is maintained at a higher temperature than that in the pyrolysis reaction zone of chamber 51, preferably a temperature between about 600° C. and 1000° C., such as between 700° C. and 900° C., as is generally required to produce high quality carbonaceous products by catalytic carbon deposition. It will be appreciated that heat must be provided to gas reactor 54, since carbon deposition is also an endothermic reaction. In its broadest conceptualisation, this heat may be provided by any suitable means, including with electrical heating elements, steam-powered heat exchangers etc. However, in preferred embodiments (as will be described in greater detail hereafter), the heat is provided by combustion of a portion of the pyrolysis gas and/or the solid carbonaceous pyrolysis products produced in the process, for example in a further reactor adjacent to gas reactor 54. In such cases, the temperature in the combustion reaction zone is controlled to be greater than that in the carbon deposition reaction zone in chamber 54, typically by about 100 to 200° C.

Partition 55, and in particular the distribution and size of apertures 61 therein, is configured such that a pressure differential is maintained between pyrolysis chamber 51 and gas reactor 54, and the resulting flow velocity of the gas mixture through the apertures is typically sufficient to prevent or suitably limit reverse flow of gases into pyrolysis chamber 54. Moreover, apertures 61 in partition 55 are sufficiently small, or otherwise suitably designed to retain solids in pyrolysis chamber 51, thereby preventing contamination of the carbonaceous deposition products.

As a result of the higher temperature in gas reactor 54, heat is transferred in the opposite direction through partition 55, i.e. from gas reactor 54 to pyrolysis chamber 51. This heat transfer occurs both by conduction through the thermally conductive partition material and by convection through apertures 61, thereby providing at least a portion of the heat necessary to drive the endothermic pyrolysis reaction in chamber 51. Heat transfer through partition 55 is highly efficient as a result of the combined convective and conductive heat transfer modes.

Pyrolysis Reactions

Pyrolysis reaction systems according to the invention include a pyrolysis chamber for conducting a pyrolysis reaction of a pyrolysable organic feed. Industrial pyrolysis reactions are typically performed at 350-750° C., depending on the feed and the target products, and the pyrolysis chamber may be suitably configured to operate in this temperature range. Pyrolysis reactions generally produce a mixture of products, which on removal and cooling include solid carbonaceous products (char), an oil fraction and a gas fraction, which have different applications in the production of energy, chemicals and fuels. The fractions of gas, oil and char produced as primary products in a pyrolysis process also vary with the heating rate, temperature and feedstock, and pyrolysis process may be classified accordingly into three process types: slow pyrolysis, fast pyrolysis and flash pyrolysis. Slow pyrolysis generally produces more char, fast pyrolysis produces more oil fraction and flash pyrolysis produces more gas fraction.

It will be appreciated that the oil product fraction of the pyrolysis reaction is substantially in vapour form when produced at the high reaction temperatures of pyrolysis. Accordingly, where the present disclosure refers to the production of a "pyrolysis gas", or its further reaction by combustion and/or carbon deposition in the pyrolysis reaction system or method of the invention, the "pyrolysis gas" is to be understood to include both the gas fraction and the vaporised oil fraction.

In embodiments of the invention where pyrolysis char is the primary product, the pyrolysis process may preferably be a slow pyrolysis process. In embodiments of the invention where carbon deposition products, produced by catalytic decomposition of gaseous pyrolysis products, are the primary product of the process, the pyrolysis process may either be a slow or a fast pyrolysis process. The heating rate of the organic feed in the pyrolysis chamber, which affects the primary pyrolysis selectivity, may be controlled by conventional means, including by controlling the temperature in the reactor, and the relative flow rates of organic feed and inert gas.

The invention is applicable to a wide range of solid pyrolysable organic feeds, including 1) waste such as plastics, tyres or any other solid hydrocarbon-containing waste or their blends; 2) biomass such as wood, straw, coffee husk and any type of biomass materials; 3) coal such as anthracite, bituminous, sub-bituminous, lignite or any other coal blends; 4) dried algae; 5) biosolids or sewage sludge; 6) food-waste; 7) any type of solid organic or inorganic human waste; 8) biomass waste such as green waste or agricultural residue or their blends and 9) hybrid inorganic and organic waste such as municipal solid waste. For the avoidance of doubt, the term "pyrolysable organic feed" as used herein refers to any feed that contains at least a portion of an organic, carbon-containing material from any source, including synthetic, mineral and bio-based sources, that can be pyrolysed to produce pyrolysis products.

The reaction temperature in the pyrolysis chamber may depend on the nature of the pyrolysable organic feed. Where the feed is a waste plastic, for example, a relatively low temperature, such as 250° C. to 400° C., may be appropriate. Where the feed is biomass, for example biosolids derived from sewage, a relatively higher reaction temperature, such as 400° C. to 750° C., may be preferred.

Pyrolysis is an endothermic reaction, and thus requires an input of energy, i.e the heat (or enthalpy) of pyrolysis. In at least some embodiments, the required energy input is provided at least in part, and preferably entirely, by sacrificial combustion of one or more of the pyrolysis product fractions. While this concept has been practiced in certain prior art designs, improved heat transfer from the combustion zone into the pyrolysis chamber is an advantage provided by at least some embodiments of the present invention, as will be described in greater detail hereafter.

Suitable residence times of solids in the pyrolysis chamber may be from 10 minutes to one hour, for example 25 to 30 minutes. Suitable pressures in the pyrolysis chamber may be between 1 and 10 bar, for example between 1 and 3 bar.

Pyrolysis according to the invention is performed in the presence of an inert gas, which is fed to pyrolysis chamber and flows out of the pyrolysis chamber through the apertures in combination with pyrolysis gas product. The flow of inert gas contributes to the pressure differential between the pyrolysis chamber and the gas reactor, which is required to prevent or substantially limit an unwanted reverse flow of gases through the apertures. In some embodiments, the inert gas is sufficiently hot that it also contributes a portion of the heat required to drive pyrolysis. In some embodiments, the organic feed and solid pyrolysis products thereof are fluidised by the flow of inert gas. This may advantageously improve mixing and heat transfer in the pyrolysis chamber.

The inert gas should generally have a low oxygen content, such as less than 4 weight %, or less than 2 weight %, since desirable pyrolysis reaction selectivity is obtained through endothermic cracking reactions in the absence of oxidants. However, it is not necessarily required that oxygen is completely excluded. In certain embodiments of the invention, the inert gas includes as at least a component a combustion flue gas, which contains some residual oxygen. The advantages provided by the use of such a gas, for example through heat integration and/or the reduction in consumption of an external inert gas supply, may outweigh the disadvantages of introducing some oxygen to pyrolysis in certain embodiments.

Partitions

Pyrolysis reaction systems according to the invention include a partition that defines a boundary between a pyrolysis chamber and an adjacent gas reactor. The partition includes a plurality of apertures to provide fluid communication between the pyrolysis chamber and the gas reactor. In some embodiments, a similar partition is also present between the gas reactor and an adjacent combustion reactor, as will be described hereafter.

The size, number and distribution of apertures in the partition are such that a pressure differential is maintained between the pyrolysis chamber and the adjacent gas reactor during operation. A suitable configuration of apertures will thus depend in part on the total flow rate of gas required to flow through the partition in operation. The target pressure differential, and resulting gas velocity through the apertures, should preferably be sufficient to prevent or suitably limit reverse flow of gas into the pyrolysis chamber. The apertures should preferably also be sufficiently small and suitably designed and/or located within the partition to exclude solids from the gas mixture flowing into the gas reactor. For example, if the pyrolysis chamber is configured to fluidise solids in the inert gas, it may be preferred that the apertures are located above the fluidisation zone of the pyrolysis chamber. However, the apertures should preferably be sufficient in number and location to allow transfer of heat through the partition by convection, thereby providing improved heat transfer from the gas reactor to the pyrolysis chamber.

With the benefit of this disclosure, a suitable size, number and distribution of apertures in the partition may be determined without undue burden by the skilled person for any particular application, having regard for the principles of the invention. In some embodiments, the size of the apertures in the partition is less than 20 mm, such as between 2 mm and 5 mm. In some embodiments, the total opening area of all the apertures in the partition is at least 50%, such as between about 50% and 90%, of the boundary area defined by the partition between the gas reactor and the pyrolysis chamber.

The partition may be in the form of a wire mesh or a perforated screen. In other embodiments, the partition may comprise plates with fins, bubble caps or other three-dimensionally structured features which advantageously further increase the heat transfer across the partition as a result of increased partition surface area. The material of construction may suitably be SS253MA, SS316L or any other high temperature alloy or quartz which can withstand the high temperatures required.

The partition with apertures may provide advantageously improved heat transfer, as discussed in greater detail below. Moreover, other benefits such as reduced weight and cost, for example via use of a simple mesh partition, may be provided. In some embodiments, the complexity and/or operability of the pyrolysis systems may be improved, since hot, unstable pyrolysis gas need not be piped externally from the pyrolysis chamber to the gas reaction chamber. In some embodiments, the partitions may be advantageously removable for cleaning and maintenance, for example via a releasable means of securing the partitions in place, such as bolting. In some embodiments, the pyrolysis systems according to the invention may provide improved flexibility in operation, due to the use of removable and reconfigurable partitions. For example, the same pyrolysis reaction system may be configured suitably for operation in the mode depicted in FIG. 2, and then reconfigured to operate in the mode depicted in FIG. 3. This may be done, for example by fitting an additional partition as described hereafter with reference to FIG. 10 below.

Partition Design for Heat Transfer

Figure 1:
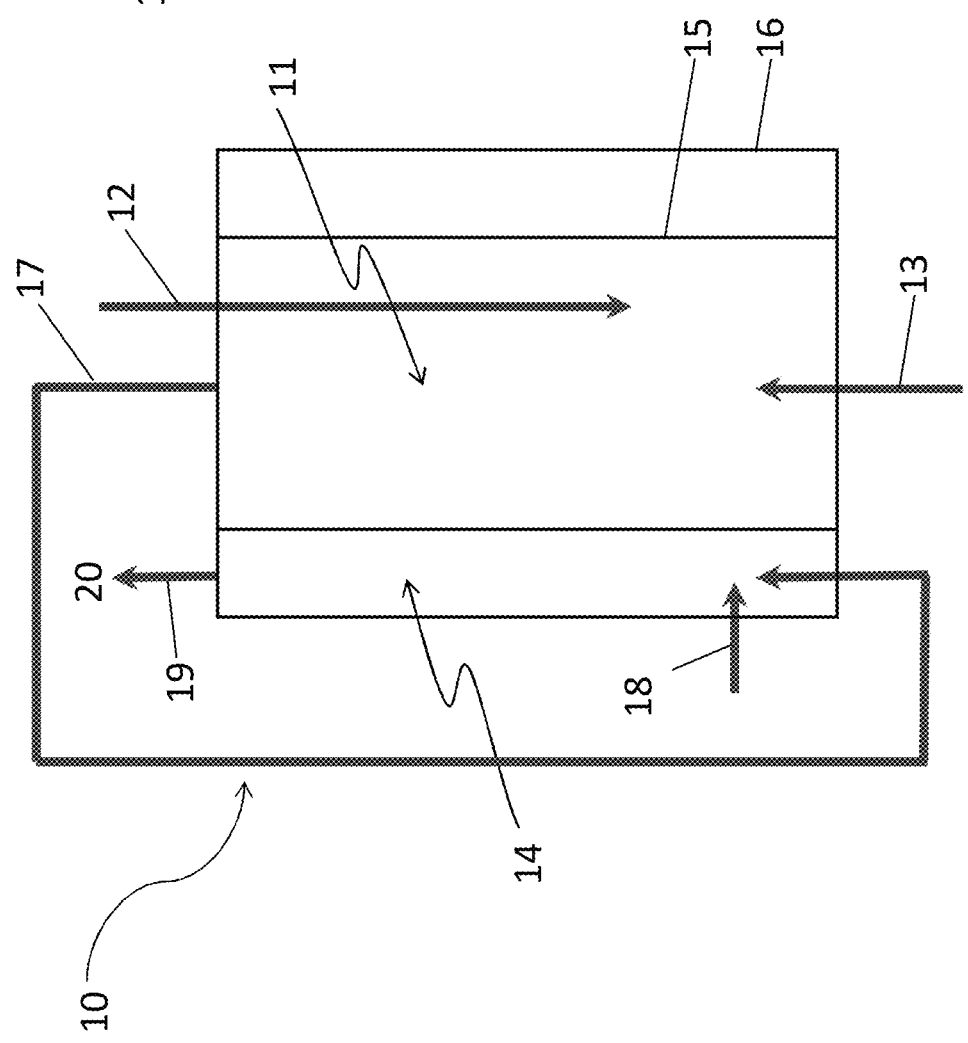

In at least some embodiments of the invention, heat transfer is provided across the aperture-containing partition that separates the high temperature gas reactor from the lower temperature pyrolysis chamber (as generally represented by partitions 35 and 55 depicted in FIGS. 2 and 3), compared with a corresponding impermeable partition (for example, partition 15 depicted in FIG. 1). The heat transfer is provided at least in part by convection through the apertures, and in some embodiments also by enhanced conductive heat transfer that occurs through the thermally conductive solid material of the partition.

Figure 4A:
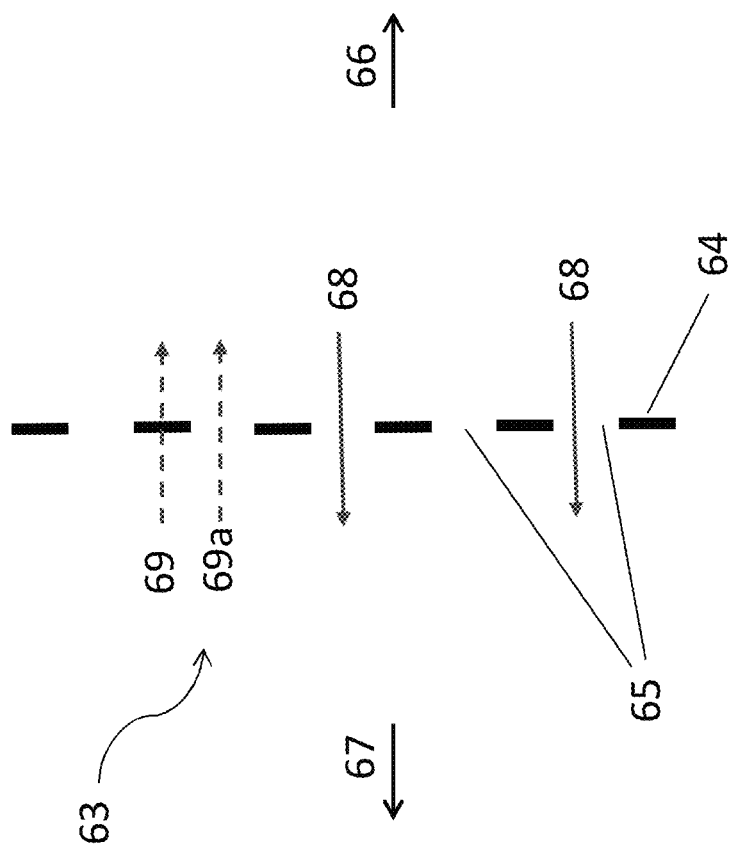
FIGS. 4 and 4A schematically depict front and side views of a mesh partition that defines a boundary between the pyrolysis chamber and the gas reactor in some embodiments of the invention.
Figure 4:
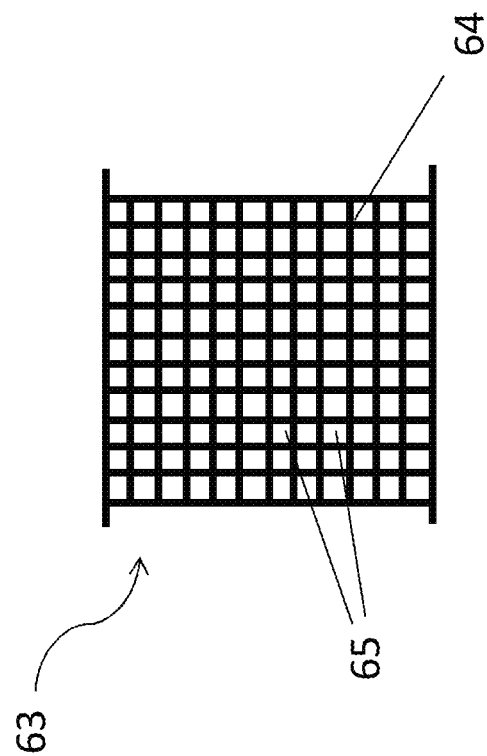

In one embodiment, partition 63 depicted in plan view in FIG. 4 includes at least a wire mesh comprising metallic wires 64 and apertures 65. As depicted in side view in FIG. 4A, gas flows during operation from pyrolysis chamber side 66 to gas reactor side 67, as represented by arrows 68. Heat flows in the opposite direction, from gas reactor side 67 to pyrolysis chamber side 66 as a result of the higher temperature in the gas reactor (whether a combustion or carbon deposition reactor). The heat is transferred both via conduction through metallic wires 64, as represented by arrow 69, and by convection through apertures 65, as represented by arrow 69a.

In another embodiment, partition 70 depicted in FIG. 5 includes at least a perforated screen comprising plate 71 and apertures 72. Apertures 72 are depicted in square pitch 73; however it will be appreciated that a triangular pitch or other arrangement of apertures may similarly be employed.

In some embodiments, heat transfer across the partition may be further improved by partition designs which increase the surface area of the partition exposed to the hot gases in the gas reactor, while still providing apertures for fluid communication and convective heat transfer between the pyrolysis chamber and the gas reactor. In the case of partition 63 depicted in FIG. 4, for example, the heat transfer area for conductive heat transfer across the partition will decrease, relative to an impermeable partition, due to apertures 65 in the wire mesh. Therefore, in an embodiment, multiple such wire meshes may be stacked together in a partition to increase the heat transfer area available for conduction, while still allowing gas flow and convective heat transfer through the stacked meshes. Thus, the arrangement is made in such a way that the total heat transfer area is increased significantly, despite the apertures.

Figure 4C:
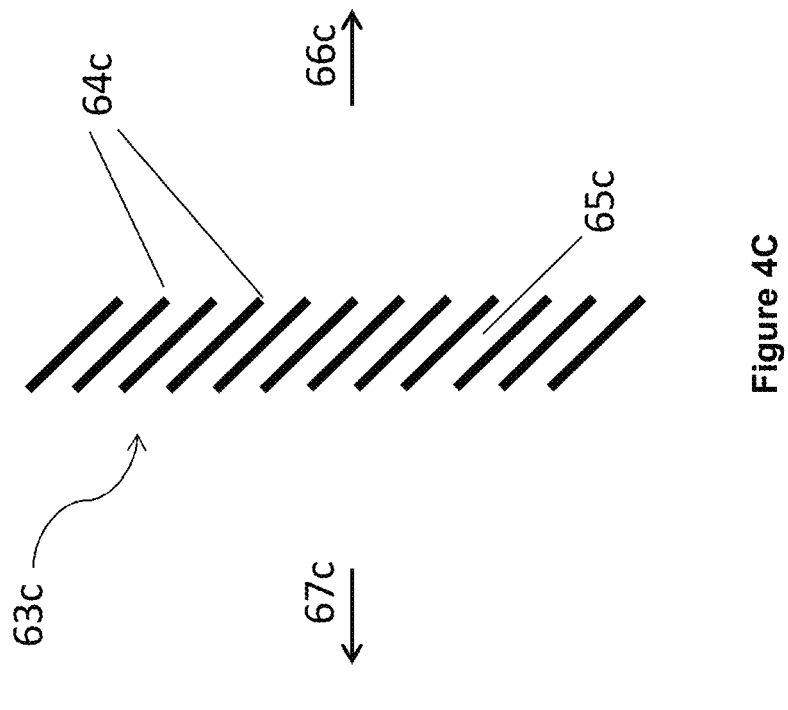
FIGS. 4B and 4C schematically depict side views of parallel plate partitions that define a boundary between the pyrolysis chamber and the gas reactor in some embodiments of the invention, in which the plates are oriented horizontally and at an inclination respectively.
Figure 4B:
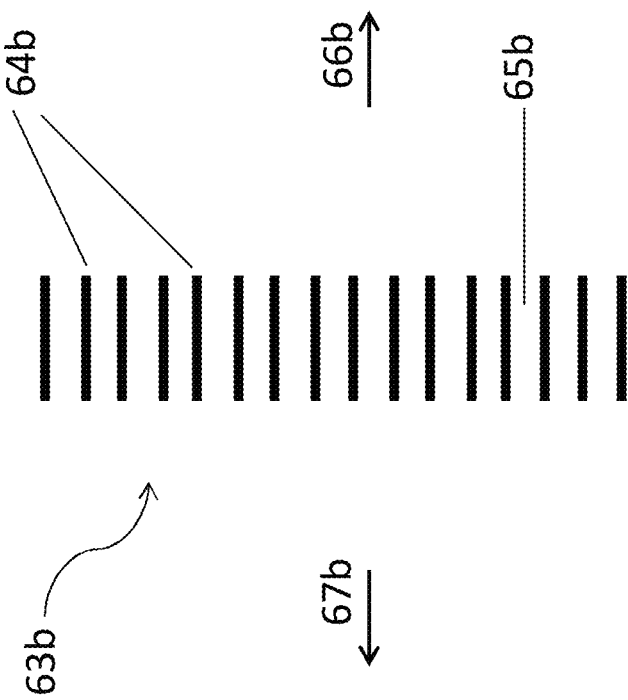

In another embodiment, multiple wire meshes or impermeable plates may be arranged substantially in parallel but apart from each other, in either horizontal or inclined orientations, thereby increasing the heat transfer area on the partition while still creating apertures between the adjacent meshes or plates to provide fluid communication. FIGS. 4B and 4C thus depict partitions 63b and 63c respectively, in which horizontal plates 64b/inclined plates 64c are arranged to provide apertures 65b/65c to allow gas flow from pyrolysis chamber side 66b/66c to gas reactor side 67b/67c, respectively. The parallel plate (or mesh) partition provides increased heat transfer area for conductive heat transfer from gas reactor side 67b/67c to pyrolysis chamber side 66b/66c, respectively. In the case of partition 63c, the inclined orientation of stacked plates 64c minimises the entrainment of solids in the gas mixture transferred from the pyrolysis chamber to the gas reactor in operation.

Figure 6A:
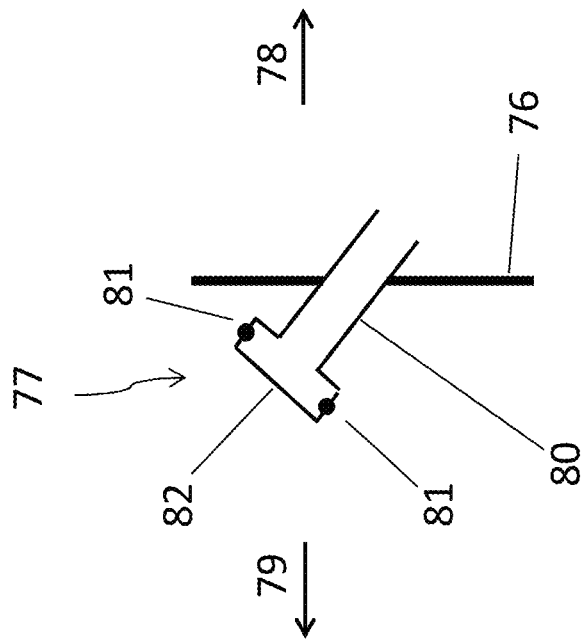
FIGS. 6 and 6A schematically depict plan and side views of a partition that defines a boundary between the pyrolysis chamber and the gas reactor in some embodiments of the invention, wherein the partition comprises bubble caps in which apertures are formed.
Figure 6:
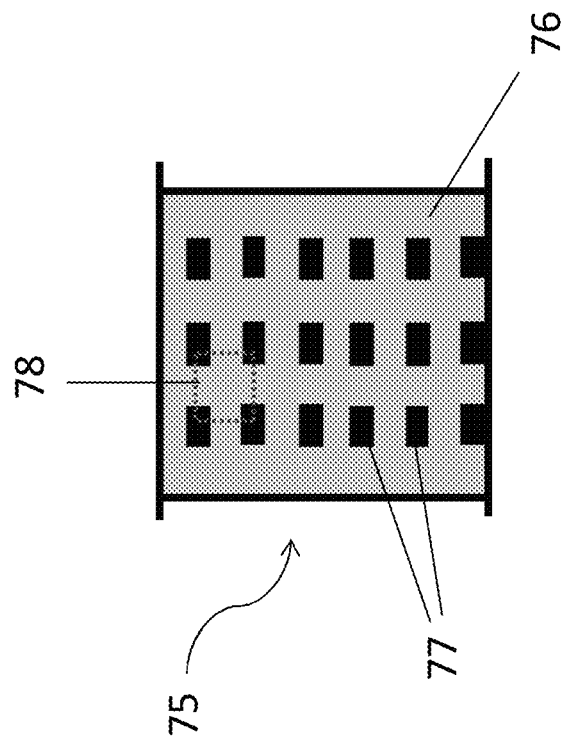

Another example of a design to enhance heat transfer area is shown in FIGS. 6 and 6A, which depicts partition 75 comprising at least plate 76 in which a plurality of bubble caps 77 are disposed in square pitch 78. As seen in side view in FIG. 6A, each bubble cap 77 comprises hollow protruding member 80, which inclines upwardly from pyrolysis chamber side 78 to gas reactor side 79. Bubble caps 77 include apertures 81 in cap 82 on the gas reactor side to provide the required fluid and convective heat communication. The external surface area of bubble caps 77 provides heat exchange surface area for improved conductive heat transfer from gas reactor side 79 to pyrolysis chamber side 78. In addition, the upward inclination of member 80 minimises the entrainment of solids in the gas mixture flowing towards apertures 81.

In another variation, one or more wire meshes or perforated plates can be stacked against plate 76, on either side, to increase the heat transfer area. In this case, the pyrolysis gas mixture is still transferred from the pyrolysis camber side 78 to gas reactor side 79 by a flow path that includes bubble cap apertures 81.

Another example of a partition design with increased surface area is shown in FIG. 7, which depicts at least a portion of partition 85 in side view. Partition 85 is in the form of corrugated fins, including protruding fin members 88 which extend towards gas reactor side 87, and recessed fin surfaces 92. Apertures 82 are provided both on the front fin surface of fin members 88 and the recessed fin surfaces 92, such that gas flows in use from pyrolysis chamber side 86 to gas reactor side 87, as represented by arrows 90. The increased surface area of the fin design provides improved conductive heat transfer from gas reactor side 87 to pyrolysis chamber side 86, as represented by arrow 91, in addition to convective heat transfer through apertures 89, represented by arrow 91a.

The fin arrangement may optionally be inclined as well. For example, as depicted in FIG. 7A, partition 85a includes a fin arrangement similar to partition 85, but wherein protruding fin members 88a extend at an upwardly inclining orientation towards gas reactor side 87. The inclined orientation minimises the entrainment of solids in the gas mixture transferred through apertures 89a from pyrolysis chamber side 86a to gas reactor side 87a in operation.

In some embodiments, the heat transfer across the partitions may be further improved by movement of the partition relative to the gas combustion reactor, for example by rotating partition 35, as depicted in FIGS. 2 and 2A, about a vertical axis through the centre of gas reactor 34.

The inventors consider that improvements of at least 40-50% in heat transfer may be provided with the pyrolysis reaction systems of the invention compared to some prior art designs. The improved heat transfer thus obtained provides a number of potential benefits, including a reduction of reactor size, improved temperature control and reaction rate in the endothermic pyrolysis reaction, and thus a higher quality of carbonaceous product materials produced. For example, in the embodiment depicted in FIG. 2, the quantity and quality of carbonaceous material, such as biochar, produced in pyrolysis chamber 31 may be improved compared with that produced in pyrolysis chamber 11 of the prior art design depicted in FIG. 1. Furthermore, compared with some prior art designs, at least some embodiments of the invention provide the advantage that external energy input is not required, as the heat of pyrolysis is provided internally by combustion of at least a portion of the pyrolysis gas.

Carbon Deposition Reactions

In some embodiments of the invention, as for example described herein for system 50 schematically depicted in FIG. 3, the gas reactor adjacent to the pyrolysis chamber is a carbon deposition reactor for producing various carbonaceous deposition products such as carbon fiber, carbon nanofiber or other carbon nanomaterials from pyrolysis gas. Carbon nanofibers, for example, can be used in many applications, including in the automobile industry, the construction industry and in furniture manufacture. It can also be used for soil amendment, soil remediation, water purification and composites.

As used herein, carbon deposition of pyrolysis gas refers to endothermic reaction of the pyrolysis gas to form carbonaceous solids, for example carbon fiber, carbon nanofiber or other carbon nanomaterials. Carbon deposition is generally performed in the presence of a catalyst. Typically, hydrogen is produced as a co-product of carbon deposition. Preferably, carbon deposition is conducted in an inert or reducing atmosphere where carbon deposition reaction predominates over exothermic oxidation reactions such as combustion.

Catalysts for carbon deposition from hydrocarbon-containing gases, including pyrolysis gas, have previously been disclosed in the art, and any such catalysts may in principle be used in the present invention. Suitable catalysts include synthetic metal catalysts, such as nickel, cobalt and copper catalysts. Exemplary catalysts include supported cobalt catalysts for carbon nanofiber and nanotube formation, as disclosed in Otsuka et al, *J. Phys. Chem. B* 2004, 108, 11464-11472; Ni—Cu—MgO catalysts for carbon nanofiber formation, as disclosed in Baker et al, *J. Phys. Chem. B* 2004, 108, 20273-20277; a hydroxyapatite-supported nickel catalyst for carbon nanofiber formation, as disclosed in Gryglewicz et al, *J. Mater. Sci.* 2016, 51, 5367-5376; and alumina-supported Ni and Ni—Cu catalysts as disclosed in Zhu et al, *Energy & Fuels* 2009, 23, 3721-3731.

The catalysts may be may be present on a monolithic support affixed within the gas reactor, or alternatively present in particulate form. Particulate catalysts may be packed or fluidised in the gas reactor. In some embodiments, particulate catalysts are continuously or periodically loaded during operation of the pyrolysis system, and continuously or periodically discharged after a suitable residence time. Suitable catalyst residence times in this context may be from 5 minutes to an hour, for example about 40 minutes.

Carbon deposition is an endothermic reaction and thus requires heat input, i.e. of the heat (or enthalpy) of carbon deposition provided at a suitably high temperature. Suitable temperatures for carbon deposition are typically from 600° C. to 1000° C., such as from 700° C. to 900° C., and the gas reactor may thus be configured in some embodiments to operate within this range.

Combustion Reactions

In some embodiments of the invention, as for example described herein for system 30 schematically depicted in FIG. 2, the gas reactor adjacent to the pyrolysis chamber is a combustion reactor, for combusting at least a portion of the pyrolysis gas produced in the pyrolysis chamber. At least a portion of this pyrolysis gas flows, as a mixture with the inert gas, through the apertures in the partition separating the gas reactor from the pyrolysis chamber, and combusts in the presence of an oxygen-containing feed (typically air) introduced to the combustion chamber.

In other embodiments of the invention, and in particular in embodiments such as system 50 (depicted in FIG. 3) where the gas reactor adjacent to the pyrolysis chamber is a carbon deposition reactor, a combustion reactor may be provided elsewhere in the pyrolysis system to combust one or more pyrolysis product fractions produced in the pyrolysis chamber. Such combustion reactors may be configured within the pyrolysis reaction system in a number of ways, as will be described hereafter.

In general, the heat of combustion produced in the combustion reactors is used to supply heat input required for the endothermic pyrolysis and/or carbon deposition reactions, preferably the entire heat input required such that the system is thermally self-sufficient. Optionally, excess heat of combustion may be used to produce steam and/or electrical power.

The temperature within the combustion reactor may be controlled according to known principles, for example by controlling the feed rate of air or by regulating the flow of coolant through a heat-exchanger, e.g. the rate of steam production. The temperature in the combustion reactor may be controlled so as to provide the necessary heat of reaction in an adjacent endothermic reactor: either the pyrolysis chamber or a carbon deposition reactor. For example, the control may be responsive to a temperature measured in the endothermic reaction zone, so as to maintain a constant or range-bound reaction temperature. The temperature in the combustion reactor may in practice be greater than the temperature in the neighbouring endothermic reaction zone by about 50 to 300° C., or 100 to 200° C. It will be appreciated that, where control is achieved by regulating the air flow to the combustion reactor, combustion of the pyrolysis gas in the combustion reactor will be incomplete. Accordingly, a secondary combustion reactor may be provided to fully combust the residual pyrolysis gas, as will be described in greater detail hereafter.

EMBODIMENTS

It will be appreciated that the pyrolysis system of the invention, for example as embodied by systems 30 and 50 depicted in FIGS. 2 and 3, has thus far been described with emphasis on the broadest principles of the invention. These principles may be applied in a number of different ways, as will now be described.

Figure 8:
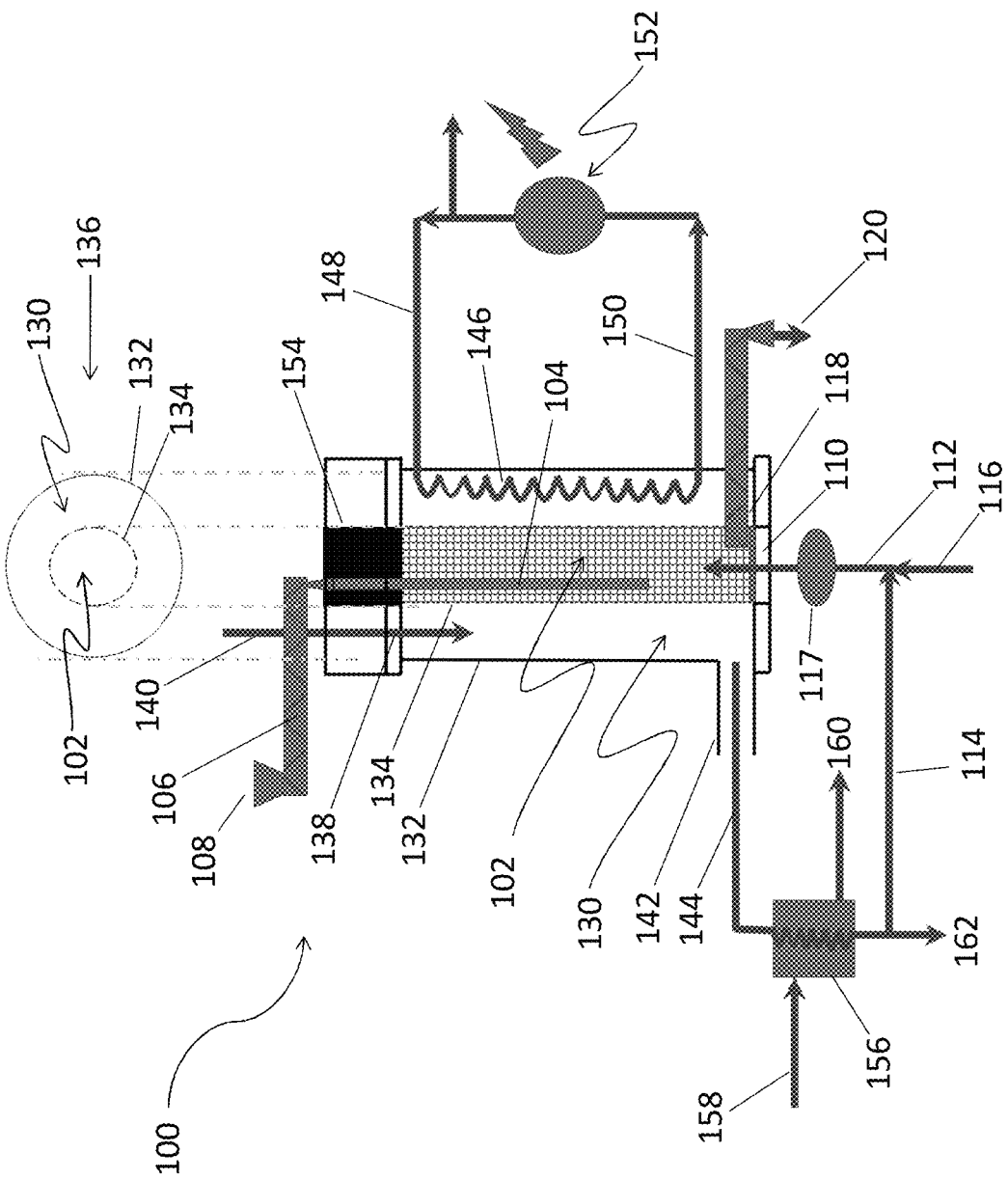
FIG. 8 schematically depicts a side view of pyrolysis reaction system 100 according to an embodiment of the invention, in which the gas reactor adjacent to the pyrolysis chamber is a combustion reactor, and in which the system produces biochar and optionally electricity as products.

An embodiment of the invention will thus be described with reference to FIG. 8, which schematically depicts pyrolysis reaction system 100. System 100 comprises cylindrical pyrolysis chamber 102 equipped with feed inlet 104 through which a pyrolysable organic feed is fed to the core or bottom of the chamber. The feed is supplied to feed inlet 104 using screw feeder 106, or other suitable conveying gears, from hopper 108.

Pyrolysis chamber 102 includes gas inlet 110, through which an inert gas 112 is fed. Inert gas 112 may include a combustion flue gas component 114 having less than 4 mass % $O_2$ content, a component of non-reactive gas 116 (such as $N_2$ or $CO_2$), or a combination thereof. Fan 117 is provided to pressurise inert gas feed 112 into the chamber 102. Pyrolysis chamber 102 is configured to fluidise the organic feed, and solid pyrolysis products thereof, in inert gas 112, thus improving mass and heat transfer during pyrolysis. Gas distributors (not shown) suitable to distribute the flow of inert gas 110 for fluidisation are thus included at the bottom of chamber 102.

Pyrolysis chamber 102 also includes product outlet 118, for discharging solid carbonaceous pyrolysis product 120, in the form of biochar, from the chamber. Outlet 118 may be equipped with a screw feeder to convey product 120 from the pyrolysis zone to a discharge location.

Pyrolysis reaction system 100 further comprises gas reactor 130, surrounding pyrolysis chamber 102. The interior reaction zone of gas reactor 130 is an annulus between impermeable cylindrical outer reactor walls 132 and partition 134, which defines a boundary between chamber 102 and gas reactor 130. The cross-sectional configuration of pyrolysis chamber 102 and gas reactor 130 can be seen in top view 136, schematically depicted in FIG. 8.

Gas reactor 130 is a combustion reactor for combusting pyrolysis gas produced in pyrolysis chamber 102, and thus includes port 138 for introducing hot air 140 and duct 142 for removing combustion flue gas 144. As depicted in FIG. 8, port 138 and duct 142 are at the top and bottom of gas reactor 130 respectively, such that the flow of gases through gas reactor 130 in use is downwards. Heat exchanger 146 is positioned inside gas reactor 102, such that water 148 fed to the heat exchanger during combustion vaporises to form steam 150 for generating power in a steam turbine 152.

Partition 134 is in the form of a cylindrical metallic mesh (or other partition configuration as disclosed herein), and thus includes a plurality of apertures providing fluid communication between pyrolysis chamber 102 and gas reactor 130. The partition and the apertures therein, are configured such that, in use, gases will flow through the partition from a higher pressure in pyrolysis chamber 102 to a lower pressure in gas reactor 130, but heat will flow in the opposite direction from gas reactor 130 to pyrolysis chamber 102. Partition 134 is configured to be rotatable relative to gas reactor 130, about a vertical axis through the centre of pyrolysis chamber 102. Rotor 154 is provided to drive the rotation.

Hot flue gas 144 leaving reactor 130 passes through heat exchanger 156, there exchanging heat with air feed 158. Resultant heated air 160 is then directed to port 138 for introduction to gas reactor 130 as at least a component of hot air 140. A portion of cooled flue gas 144 is then optionally recycled to inlet 110, as combustion flue gas component 114 of inert gas 112. The remaining flue gas 144 is directed to an exhaust system 162, where it may be treated by conventional cleaning processes (i.e. scrubbing and dust removal to remove aerosols, acids, SOx and NOx) before venting to the atmosphere.

Optionally, a portion of hot flue gas 144 is diverted before heat exchanger 156, and instead directed through a heat exchanger tube positioned in pyrolysis chamber 102 (not shown). In use, this provides additional heat for the pyrolysis reaction to supplement the heat flowing directly through partition 134 from gas reactor 130.

In use, a pyrolysable organic feed is fed via feed inlet 104 to pyrolysis chamber 102, and fluidised in inert gas 112. At the temperature (such as between 400° C. to 750° C.) maintained in chamber 102, the feed pyrolyses to produce hot pyrolysis gas (generally comprising components that on cooling would separate into gas and pyrolysis oil fractions) and solid carbonaceous pyrolysis products. After a suitable residence time in chamber 102, carbonaceous pyrolysis product 120 is discharged via product outlet 118. The pyrolysis gas product combines with inert gas 112 to form a combustible gas mixture, at an elevated pressure of between 1 and 10 bar, for example from 1 to 3 bar.

This gas mixture flows through the apertures in partition 134 and combusts in gas reactor 130 in the presence of air 140, producing an elevated temperature controlled at between 100° C. and 200° C. higher in the combustion reaction zone than in pyrolysis chamber 102. Heat thus flows from gas reactor 130 to pyrolysis chamber 102 through rotating partition 134, both by convection through the apertures and by conduction through the metallic partition material, to drive the endothermic pyrolysis reaction in chamber 102.

Heat transfer through partition 134 is highly efficient, primarily as a result of the combined convective and conductive heat transfer modes, but further improved by the rotation of partition 134 through the hot combustion gases in gas reactor 130. The heat of combustion produced in gas reactor 130 is sufficient to provide the heat of pyrolysis in pyrolysis chamber 102, such that external energy input into the process is not required. Moreover, the overall pyrolysis-combustion process is sufficiently exothermic for many pyrolysable feeds that excess heat of combustion may be used to generate steam in heat exchanger 146, and thus electrical power in turbine 152. Alternatively, excess pyrolysis gas may be withdrawn from pyrolysis chamber 102 via a withdrawal pipe (not shown), condensed and used for various purposes such as bio-chemicals or biofuel production.

The pressure differential maintained between pyrolysis chamber 102 and gas reactor 130 as a result of the design of apertures in partition 134, and the flow velocities of gas mixture through these apertures, are sufficient to prevent or suitably limit ingress of oxygen from reactor 130 into pyrolysis chamber 102. It will be appreciated that complete exclusion of oxygen may not be required, provided that the oxygen content in pyrolysis chamber 102 is low enough to allow effective pyrolysis of the feed.

Carbonaceous product 120 obtained from this process, which may be biochar when a biomass feedstock is used, is considered to be of superior quality compared to that from at least some prior art pyrolysis processes. The improvement, for example on one or more metrics such as increased surface area, porosity and improved morphology, is due to the improved heat transfer in the pyrolysis reaction system 100. It is envisaged that product 120 may be used to produce activated carbon using conventional chemical/physical activation methods. Optionally, process units for activation of product 120 can be integrated into system 100.

Figure 9:
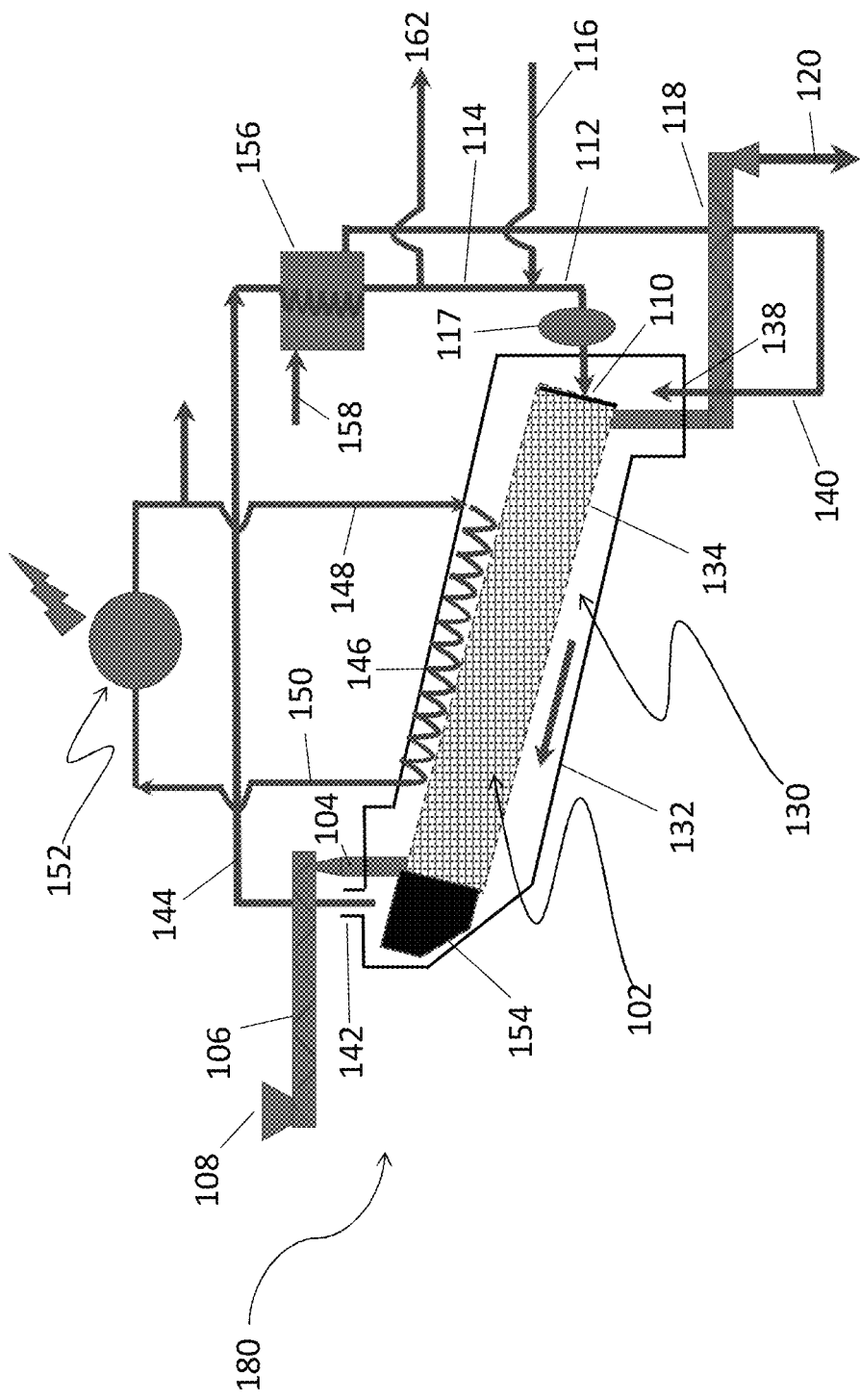
FIG. 9 schematically depicts a side view of pyrolysis reaction system 180 according to another embodiment of the invention, in which the gas reactor adjacent to the pyrolysis chamber is a combustion reactor, and in which the system produces biochar and optionally electricity as products.

A related embodiment of the invention is depicted in FIG. 9, which schematically depicts pyrolysis reaction system 190. Similarly numbered items are as described for pyrolysis reaction system 100 with reference to FIG. 8. In system 190, however, pyrolysis chamber 102 is a rotary kiln type reactor, rotated by rotor 154. Pyrolysable organic feed is fed to the top of pyrolysis chamber 102 through feed inlet 104, and is pyrolysed in a moving bed that progresses under influence of gravity and the rotation of partition 134 towards product outlet 118, where carbonaceous pyrolysis product 120 is discharged. The organic feed and solid carbonaceous products are retained within pyrolysis chamber 102 during pyrolysis by the mesh partition 134, which has suitably small apertures. However, as described for system 100, the pressured gas mixture in chamber 102, comprising inert gas 112 and pyrolysis gas product, flows through the apertures in partition 134 and combusts in the annular combustion zone of gas reactor 130. Heat of combustion flows by convection and conduction into pyrolysis chamber 102 through rotating partition 134, thereby driving the endothermic pyrolysis reaction.

Another embodiment of the invention will now be described with reference to FIG. 10, which schematically depicts pyrolysis reaction system 200. System 200 comprises cylindrical pyrolysis chamber 202 equipped with feed inlet 204 through which a pyrolysable organic feed is fed to the core or bottom of the chamber. The feed is supplied to feed inlet 204 using screw feeder 206, or other suitable conveying gears, from hopper 208.

Pyrolysis chamber 202 includes gas inlet 210, through which an inert gas 212 is fed. Inert gas 212 may include a combustion flue gas component 214, a component of non-reactive gas 216 (such as $N_2$ or $CO_2$), or a combination thereof. Fan 217 is provided to pressurise inert gas feed 212 into chamber 202. Pyrolysis chamber 202 is configured to fluidise the organic feed, and solid pyrolysis products thereof, in inert gas 212, thus improving mass and heat transfer during pyrolysis. Pyrolysis chamber 202 further includes product outlet 218, for discharging solid carbonaceous pyrolysis product from the chamber for combustion, as will be described hereafter.

Pyrolysis reaction system 200 further comprises gas reactor 230, which surrounds pyrolysis chamber 202. The interior reaction zone of gas reactor 130 is an annulus between cylindrical outer partition 272 and inner partition 234. Inner partition 234 thus defines a boundary between pyrolysis chamber 202 and gas reactor 230.

Gas reactor 230 in this embodiment is a carbon deposition reactor for producing a carbonaceous product from pyrolysis gas produced in pyrolysis chamber 202. At least one monolith 270, which includes a catalyst, is thus affixed in gas reactor 230 to provide a support for the growth of carbonaceous deposition products, such as carbon fiber or carbon nanomaterials.

Inner partition 234 is in the form of a cylindrical metallic mesh (or other partition configuration as disclosed herein), and thus includes a plurality of apertures providing fluid communication between pyrolysis chamber 202 and gas reactor 230. The partition, and the apertures therein, are configured such that, in use, gases will flow through the partition from a higher pressure in pyrolysis chamber 202 to a lower pressure in gas reactor 230, but heat will flow in the opposite direction from gas reactor 230 to pyrolysis chamber 202. Partition 234 is configured to be rotatable relative to gas reactor 230, about a vertical axis through the centre of pyrolysis chamber 202. Rotor 254 is provided to drive the rotation.

Figure 10A:
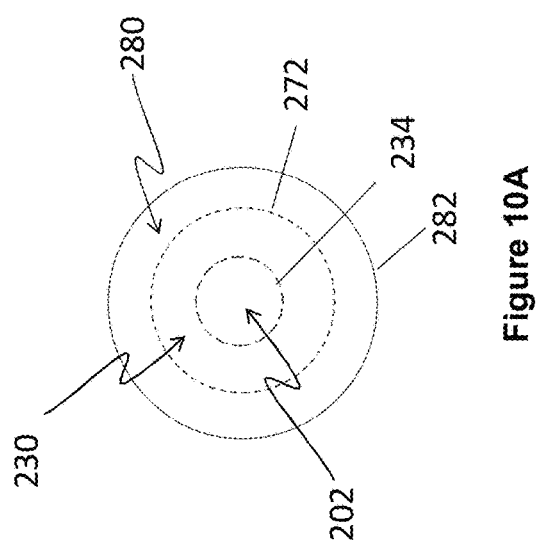
FIGS. 10 and 10A schematically depict a side view and plan view of pyrolysis reaction system 200 according to another embodiment of the invention, in which the gas reactor adjacent to the pyrolysis chamber is a carbon deposition reactor and a combustion reactor is further provided adjacent to the gas reactor to provide the heat of pyrolysis and carbon deposition, and in which the system produces carbonaceous deposition products.

Pyrolysis reaction system 200 further comprises combustion reactor 280, surrounding gas reactor 230. The interior reaction zone of combustion reactor 280 is an annulus between impermeable cylindrical reactor walls 282 and outer partition 272. Outer partition 272 thus defines a boundary between gas reactor 230 and combustion reactor 280. The cross-sectional configuration of pyrolysis chamber 202, gas reactor 230 and combustion reactor 280 is schematically depicted in FIG. 10A.

Combustion reactor 280 includes port 238 for introducing hot air 240, duct 242 for removing combustion flue gas 244, and ash outlet 247. As depicted in FIG. 10, port 138 and duct 142 are at the bottom and top of combustion reactor 280 respectively, such that the flow of gases through combustion reactor 280 in use is upwards. Combustion reactor 280 also comprises solid fuel inlet 245, through which solid carbonaceous pyrolysis product from pyrolysis reactor 202 is discharged. A screw feeder or other suitable conveying gears may be provided to convey the pyrolysis product via a pipe from outlet 218 of pyrolysis reactor 202 to inlet 245 of combustion reactor 280. Once discharged via inlet 245, solid pyrolysis product may be fluidised in the upward flow of hot air 240 for improved mass and heat transfer.

Outer partition 272 is also in the form of a cylindrical metallic mesh, perforated screen (or other suitable partition configuration disclosed herein), and thus includes a plurality of apertures providing fluid communication between gas reactor 230 and combustion reactor 280. The partition, and the apertures therein, are configured such that, in use, gases will flow through the partition from a higher pressure in gas reactor 230 to a lower pressure in combustion reactor 280, but heat will flow in the opposite direction from combustion reactor 280 to gas reactor 230, as will be explained hereafter.

Combustion reactor 280 is thus configured to combust both solid pyrolysis product discharged from pyrolysis reactor 202, and unreacted pyrolysis gas that flows from gas reactor 230 through the apertures of outer partition 272.

A portion of hot flue gas 244 leaving combustion reactor 280 passes through heat exchanger 256, there exchanging heat with air feed 258. Resultant heated air 240 is directed to port 238 for introduction to combustion reactor 230. A portion of the cooled flue gas 244 is then optionally recycled to inlet 210, as a component of inert gas 212. The remaining cooled flue gas 244 is sent to exhaust system 262.

Another portion of hot flue gas 244 is directed through a heat exchanger tube which passes through monolith 270 in gas reactor 230, and then sent to exhaust system 262. In use, this provides additional localised heating for the carbon deposition reaction taking place on the catalyst of monolith 270, supplementing the heat flowing directly through partition 272 from combustion reactor 280. Optionally, still another portion of hot flue gas 244 is fed as gas feed 281 into gas reactor 230, using fan 284 to pressurise the gas to the required pressure. Optionally, yet another portion of hot flue gas 244 is directed through a heat exchanger tube positioned in pyrolysis chamber 202 (not shown), to supplement the heat flowing directly through partition 234 from gas reactor 230.

In use, a pyrolysable organic feed is fed via feed inlet 204 to pyrolysis chamber 202, and fluidised in inert gas 212. At the temperatures of between 400° C. to 750° C. maintained in the chamber 202, the feed pyrolyses to produce pyrolysis gas and carbonaceous pyrolysis products. After a suitable residence time in chamber 202, carbonaceous pyrolysis product is discharged via outlet 218 into combustion reactor 280. The pyrolysis gas product combines with inert gas 212 to form a gas mixture in chamber 202, at an elevated pressure of between 1 bar and 10 bar, such as from 1 bar to 3 bar.

This gas mixture flows through the apertures in partition 234 as a result of the lower pressure in gas reactor 230, and a portion of the pyrolysis gas therein reacts on monolith 270. The temperature in gas reactor 230 is maintained at a higher temperature than in chamber 202, such as between 700° C. and 800° C., to allow the deposition of carbonaceous products on the heated monolith catalyst. As a result of the higher temperature maintained in gas reactor 230, heat flows to pyrolysis chamber 202 through rotating partition 234, both by convection through the apertures and by conduction through the metallic partition material, thereby driving the endothermic pyrolysis reaction in chamber 202.

The pressure differential maintained between pyrolysis chamber 202 and gas reactor 230 as a result of the design of apertures in partition 234, and the flow velocities of gas mixture through these apertures, is sufficient to prevent or suitably limit ingress of gases from gas reactor 230 into pyrolysis chamber 202. Moreover, the apertures are sufficiently small to ensure that solids are retained in pyrolysis chamber 202, thereby preventing contamination of the deposited carbonaceous materials.

After a suitable residence time to allow carbon deposition, the gas mixture in gas reactor 230, including inert gas 212 and unreacted pyrolysis gas, flows through the apertures in partition 272 to the still lower reaction pressure maintained in combustion reactor 280. The pyrolysis gas and the carbonaceous product discharged via inlet 245 both combust in combustion reactor 280 in the presence of air 240, producing an elevated temperature controlled between 900° C. and 1000° C. in the combustion reaction zone. Heat thus flows from combustion reactor 280 to gas reactor 230 through partition 272, both by convection through the apertures and by conduction through the metallic partition material, to drive the endothermic carbon deposition reaction in gas reactor 230, and indirectly the endothermic pyrolysis reaction in pyrolysis reactor 202.

Heat transfer through partition 272 is highly efficient, as a result of the combined convective and conductive heat transfer modes. The heat of combustion produced in combustion reactor 280 is sufficient to provide both the heat of carbon deposition in gas reactor 230 and the heat of pyrolysis in pyrolysis chamber 102, such that an external energy input into the process is not required. Optionally, excess heat of combustion may be used to generate steam (not shown).

The pressure differential maintained between gas reactor 230 and combustion reactor 280 as a result of the design of apertures in partition 272, and the resulting flow velocities of gas mixture through these apertures, is sufficient to prevent or suitably limit ingress of oxygen from combustion reactor 280 into gas reactor 230.

The carbon deposition products, such as carbon fibers, carbon nanofibers and the like, are expected to be of superior quality compared to those from at least some prior art pyrolysis processes. This improvement, for example on one or more metrics such as increased surface area, porosity and improved morphology, is due to improved heat transfer in the pyrolysis reaction system 200. It is envisaged that additional process steps may be undertaken to separate or further activate the carbonaceous products, and that process units for such purposes can be coupled with the existing units in an integrated manner.

Figure 10:
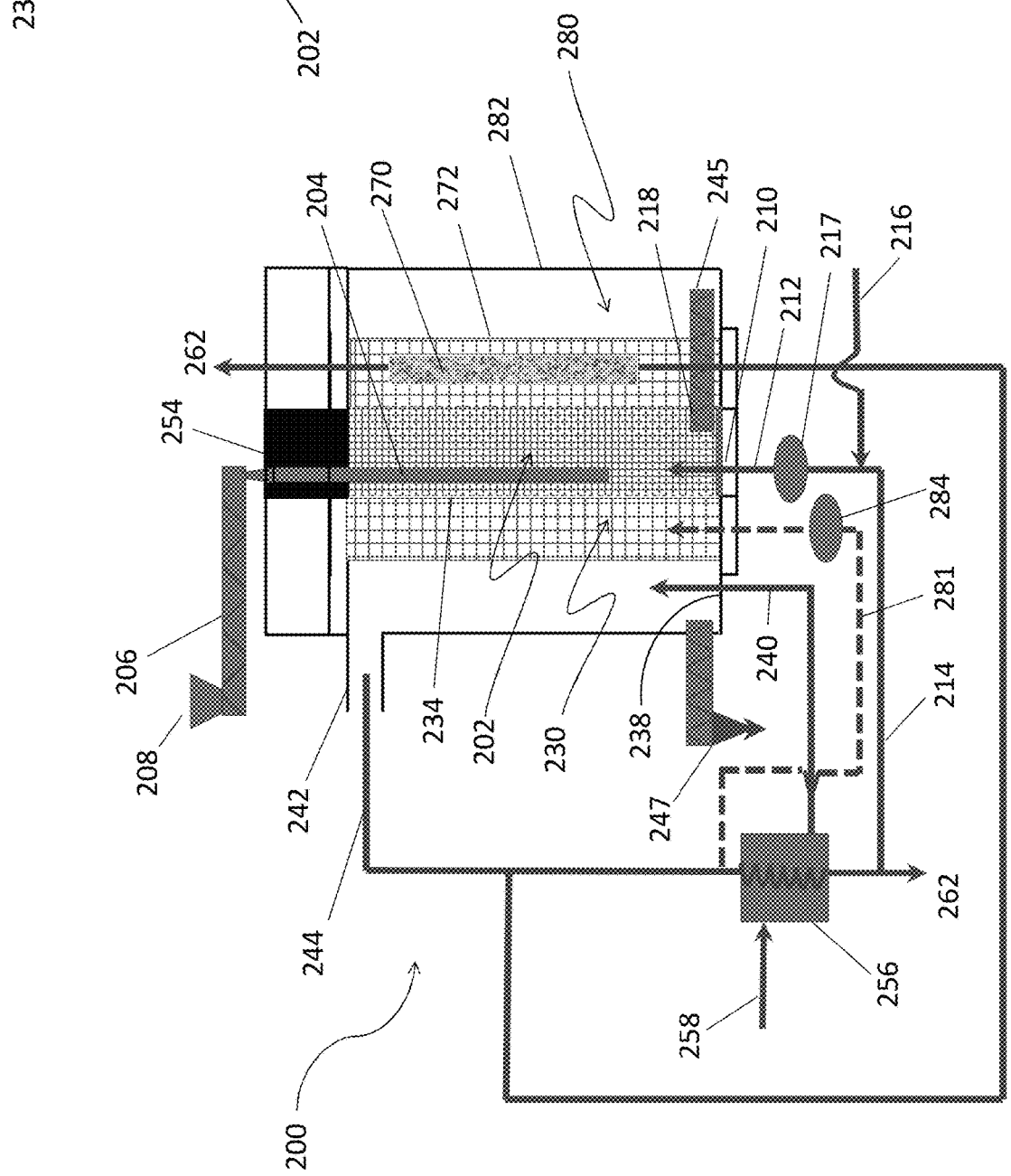

In a related embodiment, and with continued reference to FIG. 10, monolith 270 with supported catalyst is omitted from system 200. Instead a particulate catalyst for carbon deposition is added to gas reactor 230 in use, and fluidised with gas feed 281, which comprises flue gas 244 and/or a non-reactive gas such as $N_2$. Carbonaceous products thus deposit on the fluidised catalyst particles. The catalyst particles may be continuously loaded, and carbonaceous products unloaded after a suitable residence time, via a catalyst feed inlet and carbon product outlet in gas reactor 230 (not shown).

Figure 11:
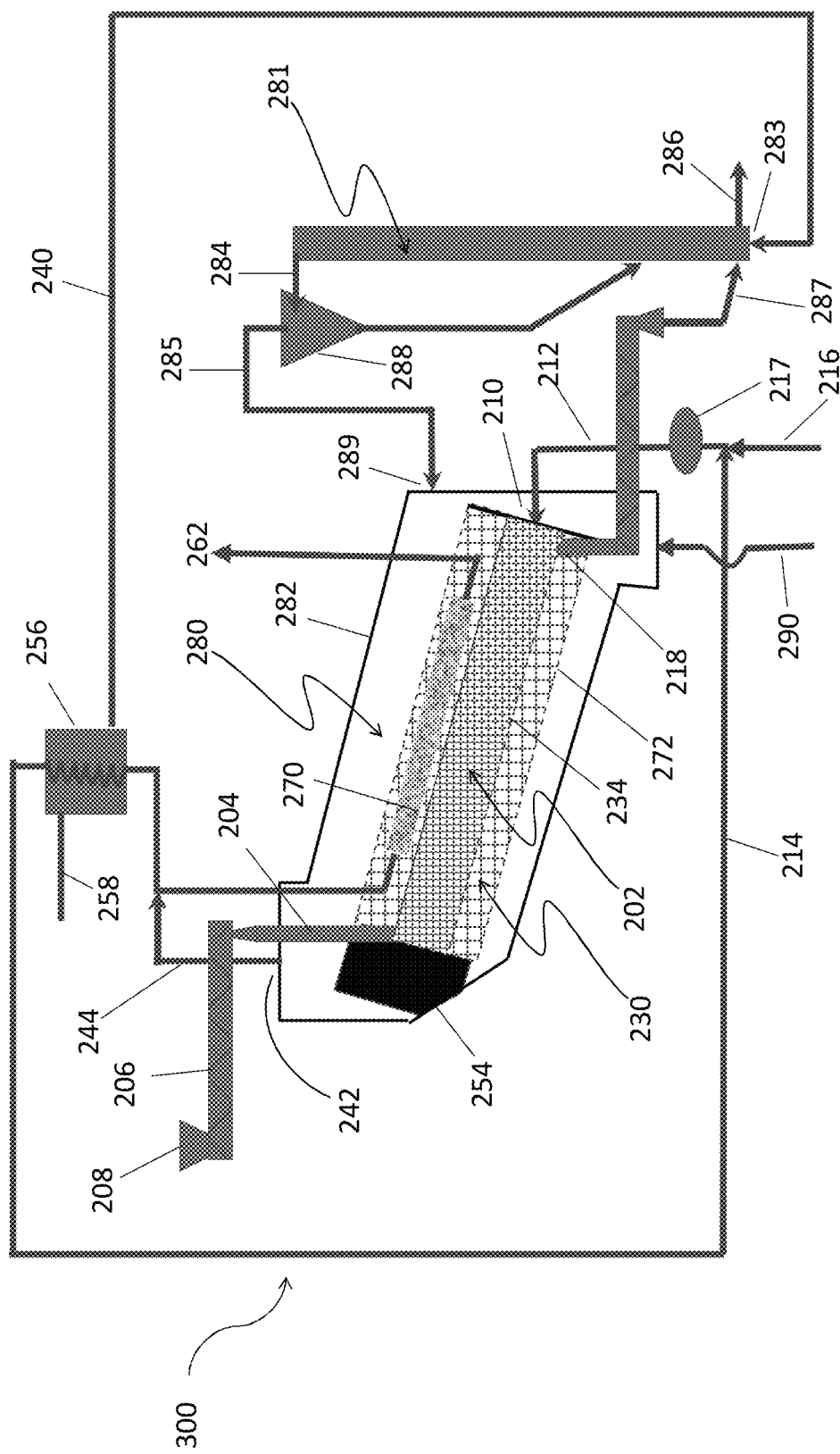
FIG. 11 schematically depicts a side view of pyrolysis reaction system 300 according to another embodiment of the invention, in which the gas reactor adjacent to the pyrolysis chamber is a carbon deposition reactor and two combustion reactors are further provided to provide the heat of pyrolysis and carbon deposition, and in which the system produces carbonaceous deposition products.

Another embodiment of the invention will now be described with reference to FIG. 11, which schematically depicts pyrolysis reaction system 300. System 300 operates according to similar principles as system 200, and similarly numbered items are as described for pyrolysis reaction system 200 shown in FIG. 10.

In system 300, however, pyrolysis chamber 202 is a rotary kiln type reactor. Pyrolysable organic feed is fed to the top of pyrolysis chamber 202 through feed inlet 204, and is pyrolysed in a moving bed that progresses under influence of gravity and the rotation of partition 234 towards product outlet 218, where carbonaceous pyrolysis product is discharged. The organic feed and solid carbonaceous products are retained within pyrolysis chamber 202 during pyrolysis by the mesh of partition 234, which has suitably small apertures.

In use, and as described for system 200, the pressurised gas mixture in chamber 202, comprising inert gas 212 and pyrolysis gas product, flows through the apertures in inner partition 234 and reacts to form carbonaceous deposition products on monolith 270 located gas reactor 230. As a result of the higher temperature maintained in gas reactor 230, heat flows by convection and conduction into pyrolysis chamber 202 through rotating partition 134, thereby driving the endothermic pyrolysis reaction.

System 300 includes combustion reactor 280, which surrounds gas reactor 230 and is separated therefrom by outer partition 272, as also present in system 200. However, differently from system 200, system 300 additionally includes further combustion reactor 281 as a physically separate unit. Combustion reactor 281 includes port 283 for introducing hot air 240, duct 284 for removing combustion flue gas 285, and ash outlet 286.

Combustion reactor 281 also includes solid fuel inlet 287, through which carbonaceous pyrolysis product from pyrolysis reactor 202 is discharged. A screw feeder or other suitable conveying gears may be provided to convey the pyrolysis product via a pipe from outlet 218 of pyrolysis reactor 202 to inlet 287 of combustion reactor 281. Once discharged via inlet 287, the solid pyrolysis product may be fluidised in the upward flow of hot air 240 for improved mass and heat transfer during combustion.

Combustion reactor 281 includes cyclone 288 for returning solids entrained in combustion flue gas 285 to the combustion zone. Hot flue gas 285 is fed from the cyclone to combustion reactor 280 via port 289.

In use, the gas mixture in gas reactor 230, including inert gas 212 and unreacted pyrolysis gas, flows through the apertures in outer partition 272 into combustion reactor 280, as described for system 200. The pyrolysis gas combusts there in the presence of oxygen provided by air feed 290 and/or residual oxygen in flue gas 285. The sensible heat provided in flue gas 285, and the heat produced by the further combustion taking place in combustion reactor 280, produces an elevated temperature controlled at between 900° C. and 100° C. in the combustion reaction zone of reactor 280. Heat thus flows from combustion reactor 280 to gas reactor 230 through partition 272, both by convection through the apertures and by conduction through the metallic partition material, to drive the endothermic carbon deposition reaction in gas reactor 230, and indirectly the endothermic pyrolysis reaction in pyrolysis reactor 202.

Figure 12:
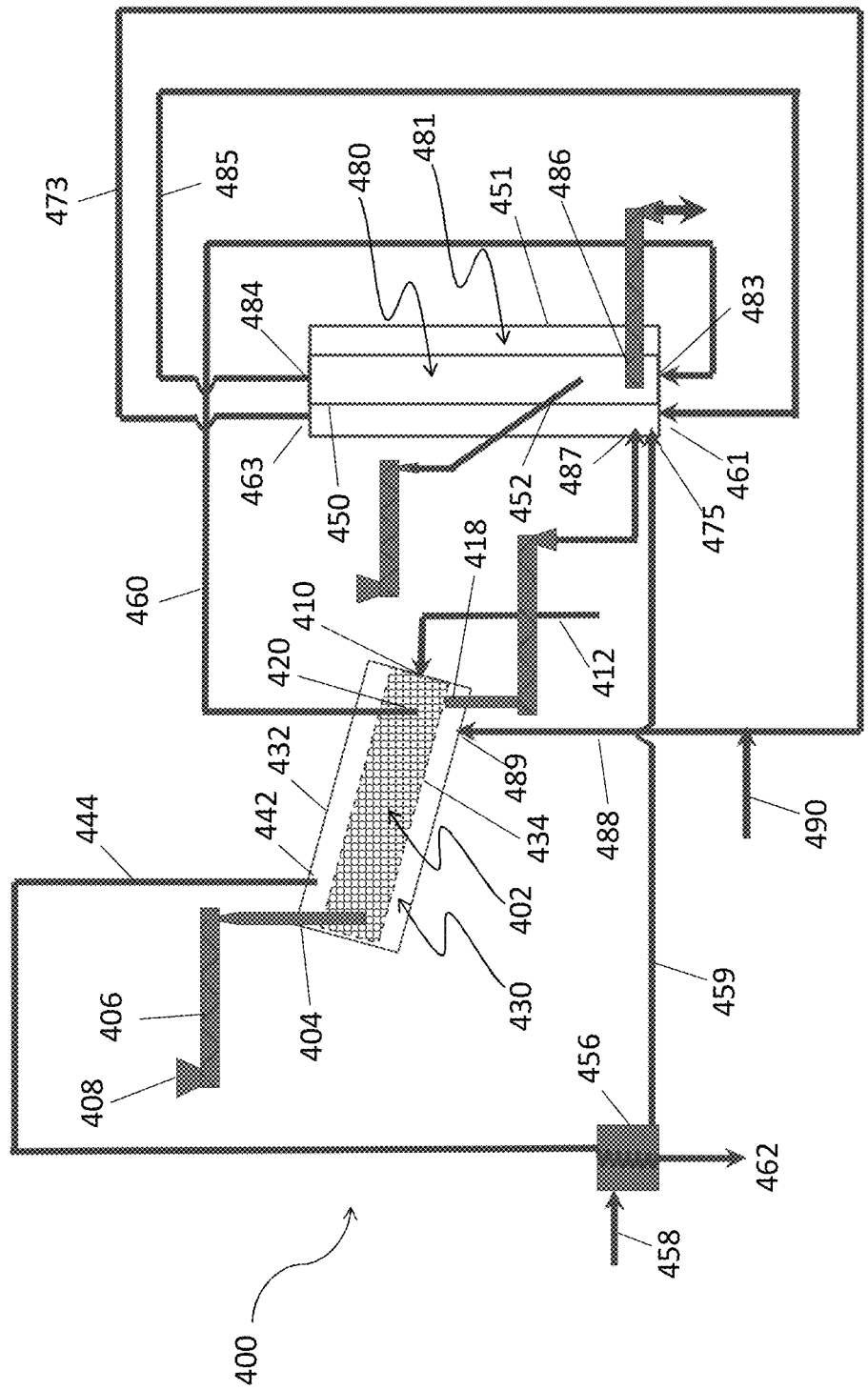
FIG. 12 schematically depicts a side view of pyrolysis reaction system 400 according to another embodiment of the invention, in which the gas reactor adjacent to the pyrolysis chamber is a combustion reactor and two additional reactors for carbon deposition and combustion are provided, and in which the system produces carbonaceous deposition products.

Another embodiment of the invention will now be described with reference to FIG. 12, which schematically depicts pyrolysis reaction system 400. System 400 comprises pyrolysis chamber 402, which is a rotary kiln type reactor rotated by a rotor (not shown). Pyrolysable organic feed is fed to the top of pyrolysis chamber 402 through feed inlet 404, using screw feeder 406 from hopper 408.

Pyrolysis chamber 402 includes gas inlet 410, through which an inert gas 412 is fed at a flow rate and pressure sufficient to provide the required pressure in chamber 402. Pyrolysis chamber 402 further includes gas duct 420 for flowing gas mixture 460 out of the chamber, and product outlet 418 for discharging solid carbonaceous pyrolysis product from the chamber for combustion, as will be described hereafter.

Pyrolysis reaction system 400 further comprises gas reactor 430, surrounding pyrolysis chamber 402. The interior reaction zone of gas reactor 430 is an annulus between impermeable cylindrical outer reactor walls 432 and partition 434, which defines a boundary between chamber 402 and gas reactor 430. Gas reactor 430 is gas combustion reactor for combusting a portion of the pyrolysis gas produced in pyrolysis chamber 402, and thus includes port 489 for introducing hot oxygen-containing gas 488 and duct 442 for removing combustion flue gas 444.

Partition 434 is in the form of a cylindrical metallic mesh (or other partition configuration as disclosed herein), and thus includes a plurality of apertures providing fluid communication between pyrolysis chamber 402 and gas reactor 430. The partition, and the apertures therein, are configured such that, in use, gases will flow through the partition from a higher pressure in pyrolysis chamber 402 to a lower pressure in gas reactor 430, but heat will flow in the opposite direction from gas reactor 430 to pyrolysis chamber 402.

Hot flue gas 444 leaving gas reactor 430 passes through heat exchanger 456, there exchanging heat with air feed 458 to produce hot air 459. Cooled flue gas 444 is sent from heat exchanger 456 to exhaust system 462.

System 400 further comprises carbon deposition reactor 480 and combustion reactor 481, as separate process units from chamber 402/gas reactor 430. Carbon deposition reactor 480 comprises impermeable cylindrical wall 450, port 483 for introducing gas mixture 460 from pyrolysis chamber 402, duct 484 for removing off-gas 485, catalyst feed inlet 452 and carbon product outlet 486.

Combustion reactor 481 surrounds carbon deposition reactor 480, with its interior reaction zone being an annulus between cylindrical outer wall 451 and cylindrical inner wall 450. Cylindrical wall 450 thus defines a boundary between combustion reactor 481 and carbon deposition reactor 480, through which heat may flow via conduction.

Combustion reactor 481 includes port 475 for introducing hot air 459, gas inlet 461 for introducing combustible off-gas 485 from carbon deposition reactor 480, and an ash outlet (not shown). Combustion reactor 481 also includes solid fuel inlet 487, through which carbonaceous pyrolysis product from pyrolysis reactor 402 is discharged. A screw feeder is provided to convey the pyrolysis product via a pipe from outlet 418 of pyrolysis reactor 402 to inlet 487 of combustion reactor 481. Once discharged via inlet 487, the solid pyrolysis product may be fluidised in the upward flow of hot air 459 for improved mass and heat transfer during combustion. Combustion reactor 481 also includes duct 463 for removing hot flue gas 473. Flue gas 473 is combined with air feed 490 (optionally a diverted portion of hot air 459) and fed to gas reactor 430 as hot oxygen-containing gas 488 via port 489.

In use, a pyrolysable organic feed is fed via feed inlet 404 to pyrolysis chamber 402. At the temperature of between 400° C. to 750° C. maintained in the chamber 402, the feed is pyrolysed in a moving bed that progresses under influence of gravity and the rotation of partition 434 towards product outlet 418, where carbonaceous pyrolysis product is discharged into combustion reactor 481. The organic feed and solid carbonaceous products are retained within pyrolysis chamber 402 during pyrolysis by the mesh partition 434, which has suitably small apertures. The pyrolysis gas product combines with inert gas 412 to form a gas mixture in chamber 402, at an elevated pressure of between 1 bar and 10 bar, such as from 1 bar to 3 bar.

A portion of this gas mixture flows through the apertures in partition 434 and combusts in gas reactor 430 in the presence of hot oxygen-containing gas 488 fed via port 489. The sensible heat provided in gas 488, and the heat produced by the combustion taking place in gas reactor 430, produces an elevated temperature controlled at between 50° C. and 300° C. higher in the combustion reaction zone than in pyrolysis chamber 402. Heat thus flows from gas reactor 430 to pyrolysis chamber 402 through rotating partition 434, both by convection through the apertures and by conduction through the metallic partition material, to drive the endothermic pyrolysis reaction in chamber 402.

In this embodiment, another portion 460 of the gas mixture in pyrolysis chamber 402 flows via gas duct 420 and is introduced through port 483 into carbon deposition reactor 480. A particulate catalyst is also added to carbon deposition reactor 480, via catalyst feed inlet 452. At the controlled temperature of between 700° C. and 800° C. maintained in the reactor, carbonaceous products deposit on the catalyst particles by reaction of the pyrolysis gas. The carbonaceous products are unloaded via carbon product outlet 486 after a suitable catalyst residence time in carbon deposition reactor 480.

After a suitable gas residence time to allow carbon deposition, the gas mixture in carbon deposition reactor 480, including inert gas 412 and unreacted pyrolysis gas, flows through duct 484 as off-gas 485. Off-gas 485 is then fed via gas inlet 461 to combustion reactor 481. The pyrolysis gas therein, and the carbonaceous pyrolysis product discharged via inlet 487, both combust in combustion reactor 481 in the presence of air 459, producing an elevated temperature controlled between 900° C. and 1200° C. in the combustion reaction zone. Heat thus flows by conduction from combustion reactor 481 to carbon deposition reactor 480 through wall 450, thereby driving the endothermic carbon deposition reaction. Hot flue gas 473 is removed from combustion reactor 481 via duct 463, combined with air feed 490 and fed to gas reactor 430, as described herein.

Figure 13:
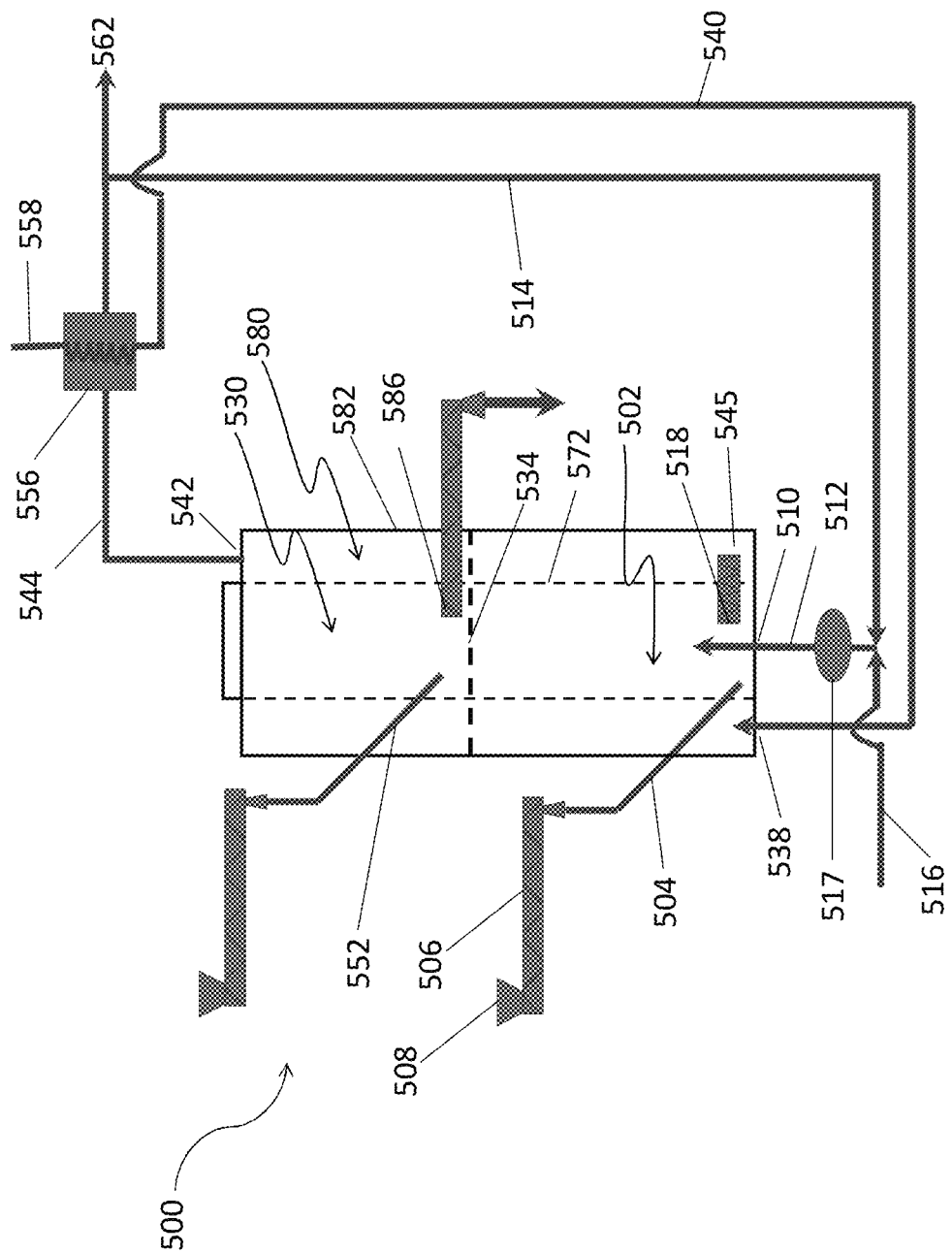
FIG. 13 schematically depicts a side view of pyrolysis reaction system 500 according to another embodiment of the invention, in which a gas reactor adjacent to and above the pyrolysis chamber is a carbon deposition reactor, and a combustion reactor surrounding both the pyrolysis chamber and gas reactor is further provided to provide the heat of pyrolysis and carbon deposition, and in which the system produces carbonaceous deposition products.

Another embodiment of the invention will now be described with reference to FIG. 13, which schematically depicts pyrolysis reaction system 500. System 500 comprises cylindrical pyrolysis chamber 502 equipped with feed inlet 504 through which a pyrolysable organic feed is fed to the core or bottom of the chamber. The feed is supplied to feed inlet 504 using screw feeder 506 from hopper 508.

Pyrolysis chamber 502 includes gas inlet 510, through which inert gas 512 is fed. Inert gas 512 may include a combustion flue gas component 514, a component of non-reactive gas 516 (such as $N_2$ or $CO_2$), or a combination thereof. Fan 517 is provided to pressurise inert gas feed 512 into chamber 502. Pyrolysis chamber 502 is configured to fluidise the organic feed, and solid pyrolysis products thereof, in inert gas 512, thus improving mass and heat transfer during pyrolysis. Pyrolysis chamber 502 further includes product outlet 518, for discharging solid carbonaceous pyrolysis product from the chamber for combustion, as will be described hereafter.

Pyrolysis reaction system 500 further comprises cylindrical gas reactor 530, which in this embodiment is positioned directly above pyrolysis chamber 502. Horizontal partition 534 separates and defines a boundary between pyrolysis chamber 502 and gas reactor 530. Cylindrical partition 572 defines the periphery of both pyrolysis chamber 502 and gas reactor 530.

Gas reactor 530 in this embodiment is a carbon deposition reactor for producing a carbonaceous product from the pyrolysis gas produced in pyrolysis chamber 202. Gas reactor 530 includes catalyst feed inlet 552 and carbon product outlet 586.

Partition 534 is in the form of a planar metallic mesh (or other partition configuration disclosed herein), and thus includes a plurality of apertures providing fluid communication between pyrolysis chamber 502 and gas reactor 530. The partition, and the apertures therein, are configured such that, in use, gases will flow through the partition from a higher pressure in pyrolysis chamber 502 to a lower pressure in gas reactor 530. Heat flows in the opposite direction from gas reactor 530 to pyrolysis chamber 502, by both conduction and convection.

Pyrolysis reaction system 500 further comprises combustion reactor 580, surrounding both pyrolysis chamber 502 and gas reactor 530. The interior reaction zone of combustion reactor 580 is an annulus between impermeable cylindrical reactor walls 582 and cylindrical partition 572. Horizontal partition 534 optionally divides combustion reactor 580 into fluidly connected lower and upper sub-zones, as depicted in FIG. 13, with the apertures providing a restricted flow of combustion gases through combustion reactor 580 and allowing independent control of temperatures and gas compositions in the sub-zones. Alternatively, partition 534 does not extend outwardly beyond cylindrical partition 572, such that uninhibited flow of gases is permitted through combustion reactor 580.

Combustion reactor 580 includes port 538 for introducing hot air 540, duct 542 for removing combustion flue gas 544, and an ash outlet (not shown). As depicted in FIG. 13, port 538 and duct 542 are at the bottom and top of combustion reactor 580 respectively, such that the flow of gases through combustion reactor 580 is upwards. Combustion reactor 580 also comprises solid fuel inlet 545, through which carbonaceous pyrolysis product from pyrolysis reactor 502 is discharged. A screw feeder is provided to convey the pyrolysis product via a pipe from outlet 518 of pyrolysis reactor 502 to inlet 545 of combustion reactor 580. Once discharged via inlet 545, solid pyrolysis product may be fluidised in the upward flow of hot air 540 for improved mass and heat transfer during combustion.

Cylindrical partition 572 is also in the form of a metallic mesh, perforated screen or the like, and thus includes a plurality of apertures providing fluid communication between combustion reactor 580 and each of pyrolysis chamber 502 and gas reactor 530. The partition, and the apertures therein, are configured such that, in use, gases will flow through the partition from the higher pressures in pyrolysis chamber 502 and gas reactor 530 to the lower pressure maintained in combustion reactor 580, but heat is able to flow in the opposite direction from combustion reactor 580 to each of pyrolysis chamber 502 and gas reactor 530, as will be explained hereafter.

Combustion reactor 580 is thus configured to combust both solid pyrolysis product discharged from pyrolysis reactor 502, and unreacted pyrolysis gas that flows from pyrolysis chamber 502 and gas reactor 530 through the apertures of cylindrical partition 572.

Hot flue gas 544 leaving combustion reactor 580 passes through heat exchanger 556, there exchanging heat with air feed 558. Resultant heated air 540 is directed to port 538 for introduction to combustion reactor 530. A portion of the cooled flue gas 544 is then optionally recycled to inlet 510, as combustion flue gas component 514 of inert gas 512. The remaining cooled flue gas 544 is sent to exhaust system 562.

Optionally, a portion of hot flue gas 544 is directed through one or more heat exchanger tubes which pass through pyrolysis chamber 502 and/or gas reactor 530 (not shown). In use, this provides additional heat for the endothermic pyrolysis and/or carbon deposition reactions, supplementing the heat from combustion reactor 280 flowing directly to pyrolysis chamber 502 and/or gas reactor 530 through cylindrical partition 272.

In use, a pyrolysable organic feed is fed via feed inlet 504 to pyrolysis chamber 502, and fluidised in inert gas 512. At the temperature of between 400° C. to 750° C. maintained in the chamber 502, the feed pyrolyses to produce pyrolysis gas and carbonaceous pyrolysis products. After a suitable residence time in chamber 502, carbonaceous pyrolysis product is discharged via outlet 518 into combustion reactor 580. The pyrolysis gas product combines with inert gas 512 to form a gas mixture in chamber 502, at an elevated pressure of between 1 bar and 10 bar, such as from 1 bar to 3 bar.

This gas mixture flows through the apertures in both partitions 534 and 572, as a result of the lower pressures in gas reactor 530 and combustion reactor 580. It will be appreciated that the relative proportion of flow to gas reactor 530 and combustion reactor 580 may be controlled by the relative size and abundance of the apertures in the partitions, and the pressures controlled in the reactors.

A particulate catalyst is added to gas reactor 580 via catalyst feed inlet 552, and fluidised in the gas mixture entering gas reactor 580 through partition 534. At the temperature of between 700° C. and 800° C. maintained in the reactor, the pyrolysis gas in the gas mixture reacts by carbon deposition to form carbonaceous products on the catalyst particles. The apertures in partition 534 are sufficiently small to ensure that solids are retained in pyrolysis chamber 502, thereby preventing contamination of the deposited carbonaceous materials. The carbonaceous products, such as carbon fibers or carbon nanomaterials, are unloaded via carbon product outlet 586 after a suitable catalyst residence time in gas reactor 580.

As a result of the higher temperature maintained in gas reactor 530, heat flows to pyrolysis chamber 502 through partition 534, both by convection through the apertures and by conduction through the metallic partition material, thereby providing at least a portion of the heat required to drive the endothermic pyrolysis reaction in chamber 502.

The gas mixtures in both pyrolysis chamber 502 and gas reactor 530, each of which include inert gas 512 and pyrolysis gas, flow through the apertures of cylindrical partition 572 into combustion reactor 580. The pyrolysis gas in these mixtures, and the carbonaceous product discharged via inlet 545, combust in combustion reactor 580 in the presence of air 540, producing an elevated temperature suitably higher in the combustion reaction zone than the adjacent pyrolysis and carbon deposition reaction zones. Heat thus flows from combustion reactor 580 to both pyrolysis chamber 502 and gas reactor 530 through partition 572, by convection through the apertures and by conduction through the metallic partition material, to provide at least a portion of the heat of reaction for the endothermic pyrolysis and carbon deposition reactions.

Pressure differentials are maintained between combustion reactor 580 and each of pyrolysis chamber 502 and gas reactor 530 as a result of the design of apertures in partition 572. These pressure differentials, and the resulting flow velocities of gas mixture through the apertures, are sufficient to prevent or suitably limit ingress of oxygen from combustion reactor 580 into pyrolysis chamber 502 and gas reactor 530.

Heat transfer through partitions 534 and 572 is highly efficient, as a result of the combined convective and conductive heat transfer modes. The heat of combustion produced in combustion reactor 580 is sufficient to provide both the heat of carbon deposition in gas reactor 530 and the heat of pyrolysis in pyrolysis chamber 502, such that an external energy input into the process is not required. Optionally, excess heat of combustion may be used to generate steam (not shown).

The carbon deposition products, such as carbon fibers, carbon nanofibers and the like, are expected to be of superior quality compared to those from at least some prior art pyrolysis processes, for example on one or more metrics such as increased surface area, porosity and improved morphology, due to improved heat transfer in the pyrolysis reaction system 500.

Figure 14:
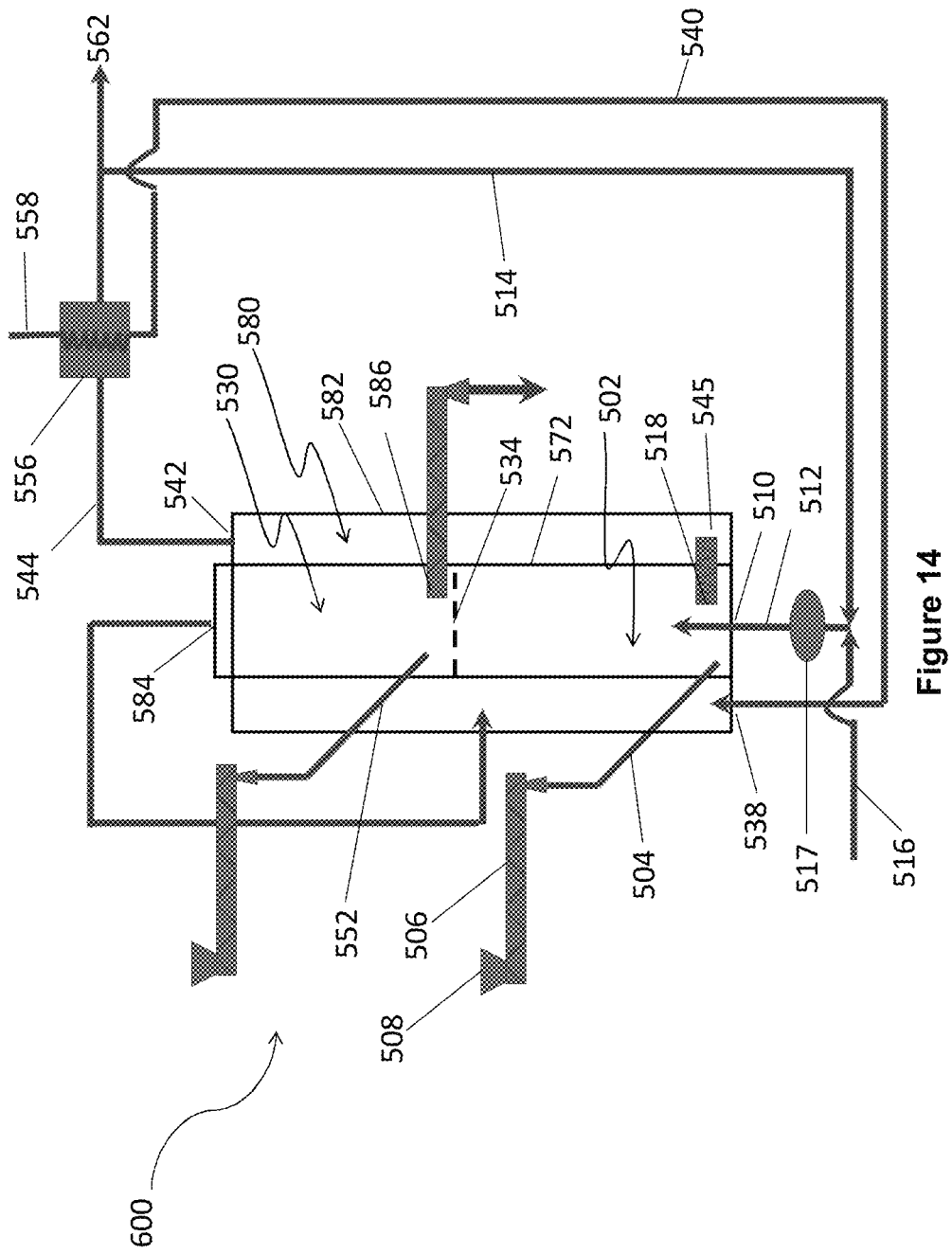
FIG. 14 schematically depicts a side view of pyrolysis reaction system 600 according to another embodiment of the invention, in which a gas reactor adjacent to and above the pyrolysis chamber is a carbon deposition reactor, and a combustion reactor surrounding both the pyrolysis chamber and gas reactor is further provided to provide the heat of pyrolysis and carbon deposition, and in which the system produces carbonaceous deposition products.

A related embodiment of the invention is depicted in FIG. 14, which schematically depicts pyrolysis reaction system 600. Similarly numbered items are as described for pyrolysis reaction system 500 with reference to FIG. 13, and system 600 operates according to similar principles as system 500 except as described hereafter. In system 600, cylindrical partition 572 is an impermeable metallic wall, through which the gas mixtures in pyrolysis chamber 502 and gas reactor 530 cannot flow. Therefore, gas reactor 530 includes off-gas duct 584 through which off-gas 585 is removed and sent to combustion reactor 580 via gas inlet 561. The unreacted pyrolysis gas in this feed combusts in combustion reactor 580, together with solid pyrolysis product discharged via solid fuel inlet 545. In this embodiment, the heat of combustion flows by conduction from combustion reactor 580 to both pyrolysis chamber 502 and carbon deposition reactor 480 through impermeable partition 572, thereby driving the endothermic pyrolysis and carbon deposition reactions.

A further variation, applicable to both systems 500 and 600, is that at least one monolith, which includes a catalyst, is located in gas reactor 530 to provide a support for the growth of carbonaceous deposition products such as carbon fiber or carbon nanomaterials. In this case, the particulate fluidisable catalyst is not fed to gas reactor 530.

Figure 15:
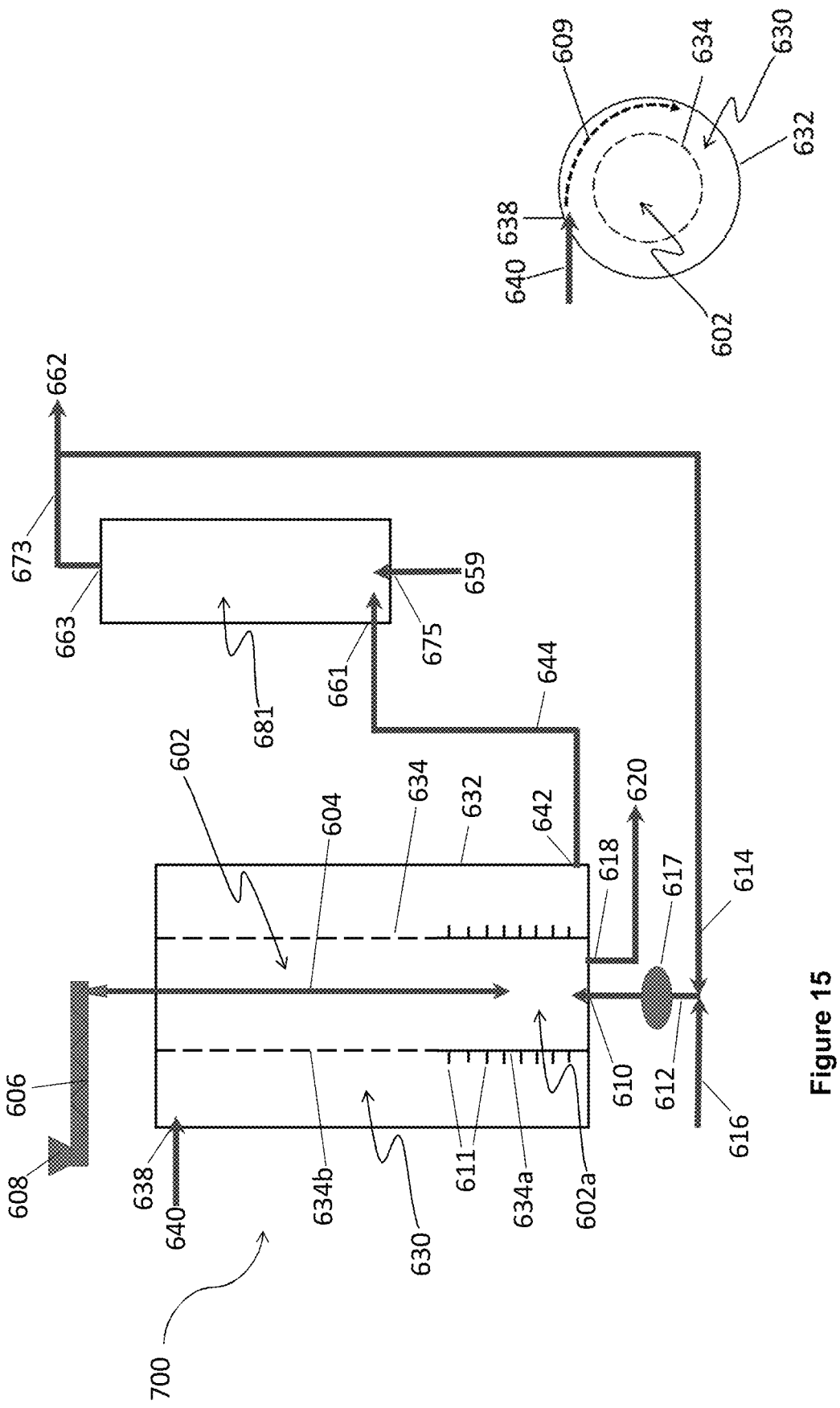

Another embodiment of the invention will be described with reference to FIG. 15, which schematically depicts pyrolysis reaction system 700. System 700 comprises cylindrical pyrolysis chamber 602 equipped with feed inlet 604 through which a pyrolysable organic feed is fed to fluidisation zone 602a at the bottom of the chamber. The feed may be supplied to inlet 604 by any means, for example using screw feeder 606 from hopper 608 as depicted.

Pyrolysis chamber 602 includes gas inlet 610, through which an inert gas 612 is fed. Inert gas 612 preferably includes only combustion flue gas component 614 during steady state operation, but may be supplemented by non-reactive gas 616 (such as $N_2$ or $CO_2$), for example during start-up. Fan 617 is provided to pressurise inert gas feed 612 via fluidisation gas distributors into chamber 602, thus fluidising the organic feed and solid pyrolysis products thereof in fluidisation zone 602a. Pyrolysis chamber 602 includes product outlet 618 for discharging solid carbonaceous pyrolysis product 620, in the form of biochar, from the fluidised bed.

Pyrolysis reaction system 700 further comprises gas reactor 630 surrounding pyrolysis chamber 602. The interior of gas reactor 630 is an annulus between impermeable cylindrical outer reactor walls 632 and cylindrical partition 634, which defines a boundary between chamber 602 and reactor 630. The cross-sectional configuration of pyrolysis chamber 602 and gas reactor 630 is schematically depicted in plan view in FIG. 15A.

Gas reactor 630 is a primary combustion reactor for combusting pyrolysis gas produced in pyrolysis chamber 602, and thus includes port 638 for introducing primary air 640 and duct 642 for withdrawing combustion flue gas 644. Port 638 and duct 642 are at the top and bottom of gas reactor 630 respectively. As seen in FIG. 15A, port 638 is configured to feed air 640 tangentially into annular gas reactor 630. Thus, in use, a cyclonic or vortex-like flow is created adjacent outer reactor walls 632, as depicted by arrow 609. The combustion zone in reactor 630 may thus advantageously be located close to outer walls 632, and thus removed from partition 634. To this end, the internal surface of reactor walls 632 may also be configured to induce ignition, for example with conventional refractory linings having thermal inertia suitable for flameless combustion.

Cylindrical partition 634 includes impermeable lower portion 634a and mesh upper portion 634b. Lower portion 634a, which lacks apertures but is provided with fins 611 for improved conductive heat transfer, is of sufficient height to retain fluidised solids in fluidisation zone 602a. Upper portion 634b includes a plurality of apertures in the mesh which provide fluid communication between pyrolysis chamber 602 and gas reactor 630. Partition 634 is configured such that, in use, gases will flow through the apertures from a higher pressure in pyrolysis chamber 602 to a lower pressure in gas reactor 630, but heat will flow in the opposite direction. Moreover, it is believed that the vortex flow in gas reactor 630 will lower the pressure adjacent the partition, thus drawing gas through the mesh apertures from the pyrolysis chamber and limiting the reverse flow of oxygen.

As will be further described below, combustion in gas reactor 630 is generally intentionally incomplete and flue gas 644 thus includes unreacted pyrolysis gas. This flue gas is fed into secondary combustion reactor 681 via port 661, and the residual pyrolysis gas is combusted in the presence of secondary air 659, fed via port 675. Hot secondary flue gas 673 leaving reactor 681 via duct 663 is at least partially recycled to form combustion flue gas component 614, with a portion sent to exhaust system 662 as needed. Optionally, excess heat of combustion in secondary combustion reactor 681 may be used to generate steam (not shown) or otherwise recovered for purposes of energy efficiency.

In use, a pyrolysable organic feed is fed via feed inlet 604 to the fluidisation zone of pyrolysis chamber 602, and fluidised with inert gas 612. At the target temperature (such as between 400° C. to 750° C.) maintained in chamber 602, the feed pyrolyses to produce hot pyrolysis gas and solid carbonaceous pyrolysis products. After a suitable residence time in chamber 602, carbonaceous pyrolysis product 620 is discharged via product outlet 618. The pyrolysis gas product combines with inert gas 612 to form a combustible gas mixture.

This gas mixture flows through the apertures in partition 634 and is partially combusted in gas reactor 630 in the presence of air 640. Heat of reaction flows through partition 634 into chamber 602, both by convection through the apertures in upper portion 634b and by conduction through the metallic partition material of both upper and lower portions. The flow rate of air 640 into gas reactor 630 is controlled to provide only the heat needed to drive the exothermic pyrolysis reactions in pyrolysis chamber 630. For example, the flow rate may be regulated responsively to a temperature measured within the fluidised bed, so as to target a constant pyrolysis temperature. The temperature in primary combustion reactor 630 will typically be between 50° C. and 200° C. higher than in pyrolysis chamber 602.

Flue gas 644, containing residual pyrolysis gas, is then combusted in secondary gas reactor 681. The flow rate of secondary air 659 to this combustion is controlled to ensure that secondary flue gas 673 has a low oxygen content, for example less than 4 mass % $O_2$, and preferably less than 1 mass % $O_2$. Advantageously, the hot secondary flue gas may then be recycled and used as inert gas 612, thus avoiding (or minimising) the need for an external source of inert gas such as utility $N_2$. Furthermore, the high temperature of the recycled combustion flue gas contributes to driving the endothermic pyrolysis reaction in chamber 630.

Pyrolysis of Biosolids

Figure 16:
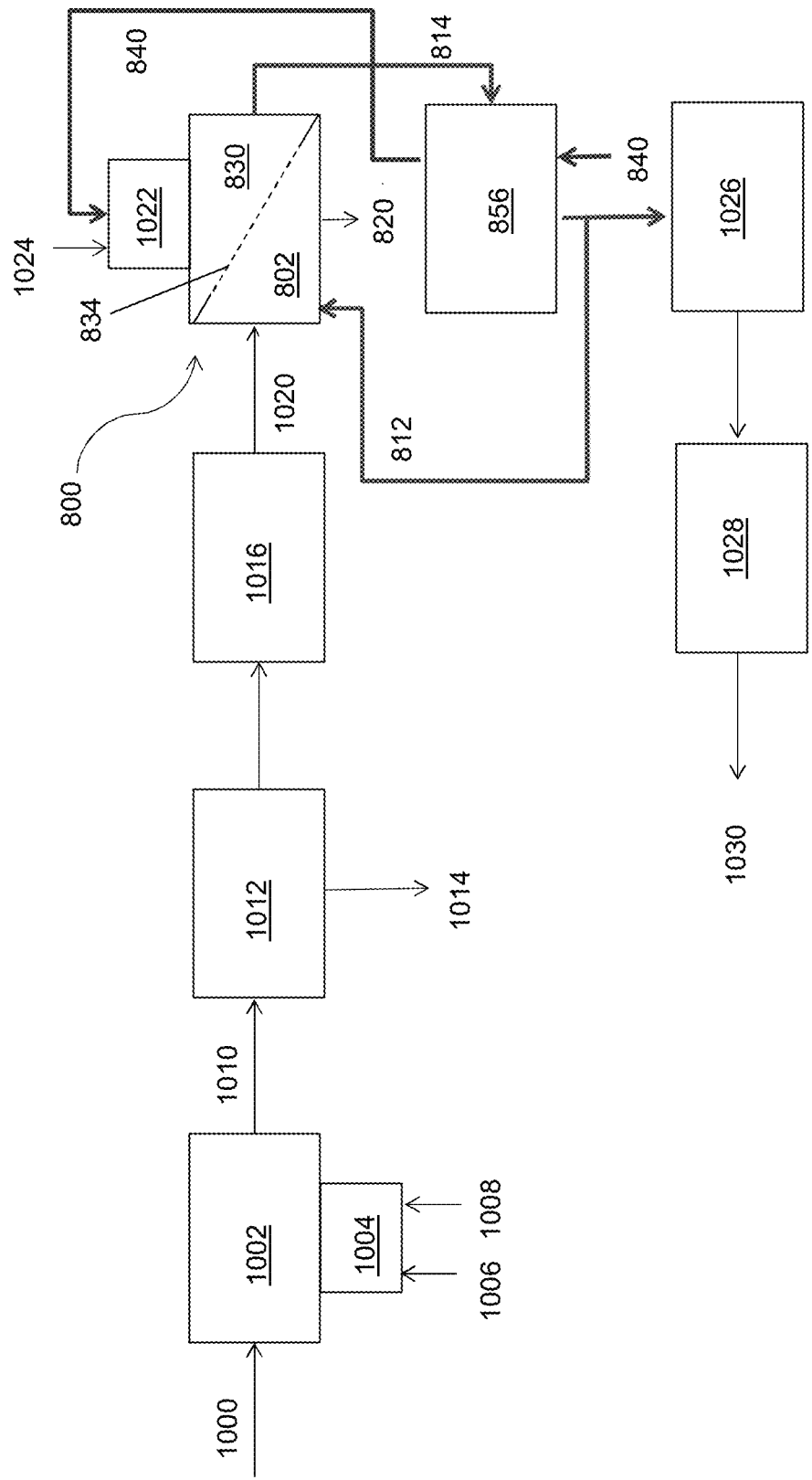
FIG. 16 is a block flow diagram of a process for converting biosolids into biochar, using a pyrolysis reaction system according to embodiments of the invention.
Figure 17:
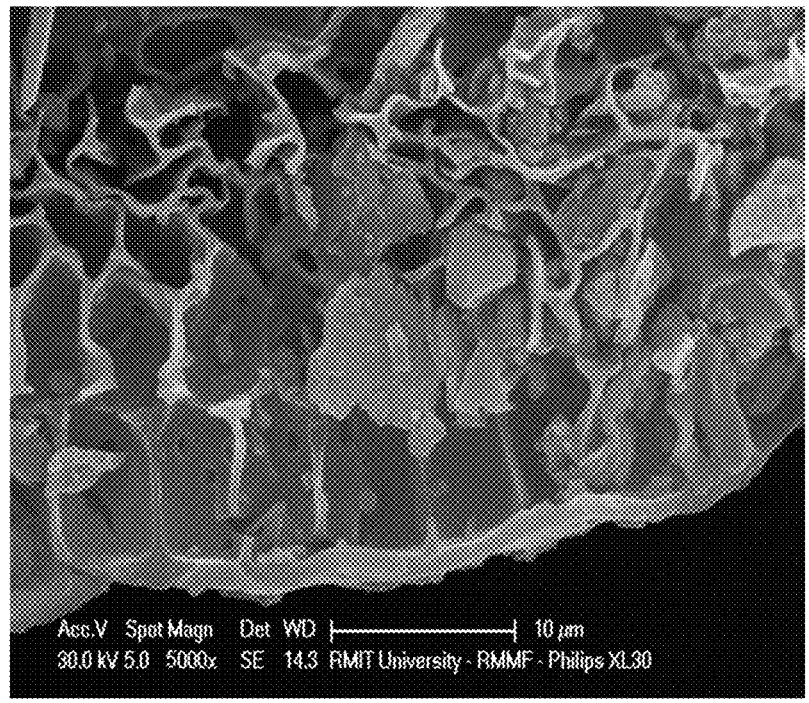
FIG. 17 is a SEM image of biochar produced by isothermally pyrolysing a biosolid feed at 500° C. in Example 1.
Figure 18:
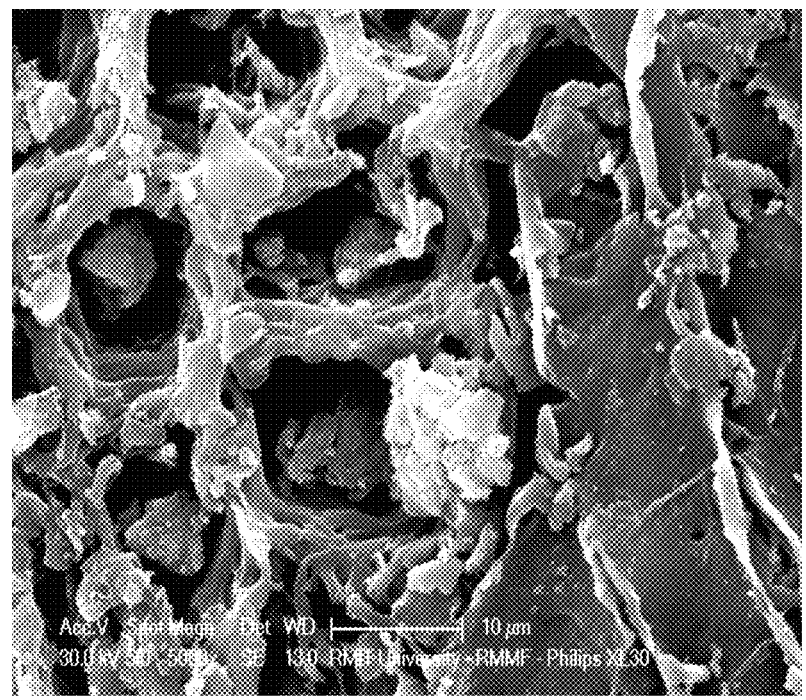
FIG. 18 is a SEM image of biochar produced by isothermally pyrolysing a biosolid feed at 600° C. in Example 1.
Figure 19:
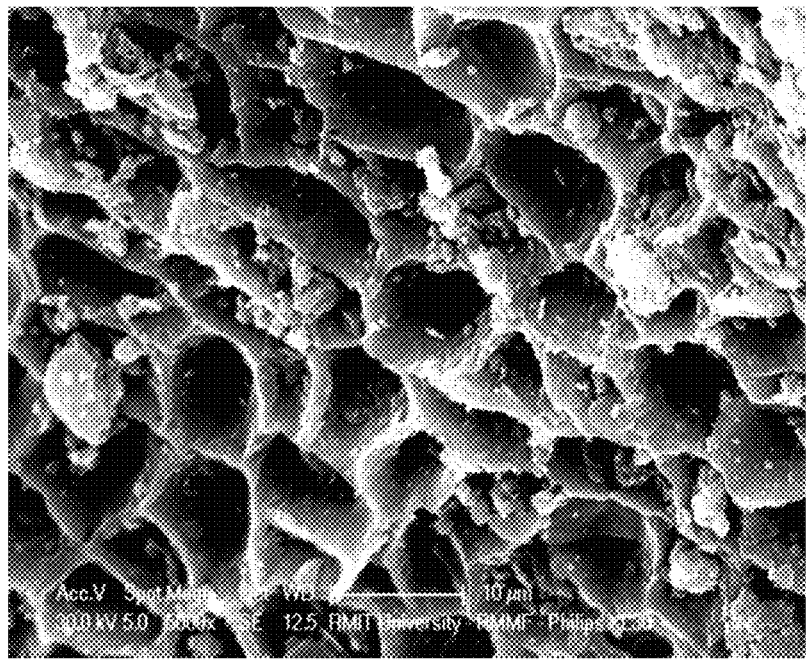
FIG. 19 is a SEM image of biochar produced by isothermally pyrolysing a biosolid feed at 700° C. in Example 1.
Figure 20:
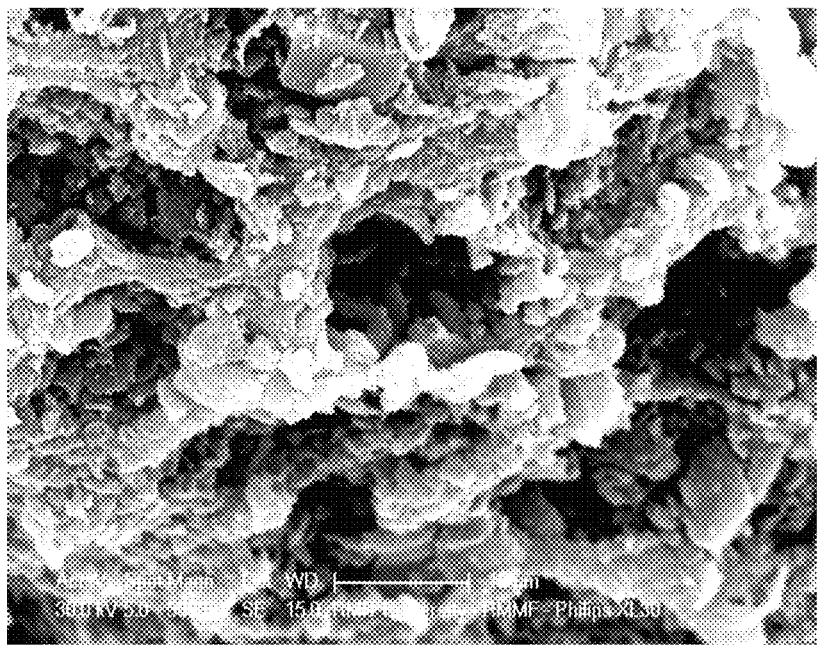
FIG. 20 is a SEM image of biochar produced by isothermally pyrolysing a biosolid feed at 800° C. in Example 1.
Figure 21:
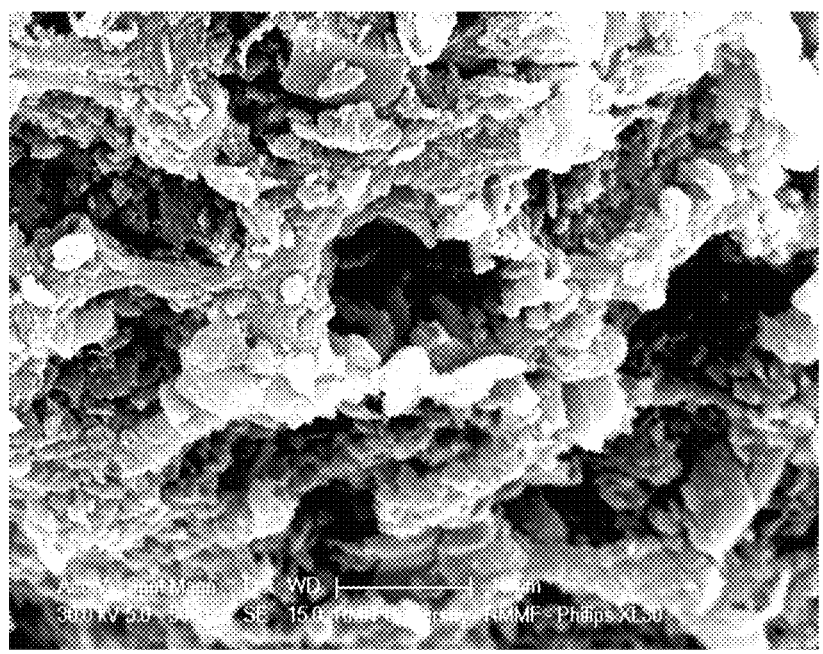
FIG. 21 is a SEM image of biochar produced by isothermally pyrolysing a biosolid feed at 900° C. in Example 1.

Embodiments of the pyrolysis reaction system disclosed herein may be useful in pyrolysis of biosolids. Depicted in FIG. 16 is a block flow diagram of a process for converting biosolids, a by-product of a wastewater treatment plant, into biochar.

Wet biosolids 1000, containing c.a. 40 wt % solids, is dried in rotary drier 1002, which is heated with burner 1004 fed by natural gas 1006 and air 1008. Dried biosolids 1010, now with a solids content of c.a. 80 wt %, is fed to pin-mill grinder 1012 to reduce the biosolids to a particle size appropriate for fluidisation. Rejected fines 1014 are removed from the process, and the particulate biosolids are classified in sieve shaker 1016 and fed as biosolids feedstock 1020 to pyrolysis reaction system 800 according to the present invention. Pyrolysis reaction system 800 thus includes pyrolysis chamber 802 and combustion chamber 830, separated by partition 834 having a plurality of apertures. Optionally, pyrolysis system 800 may be according to embodiments disclosed herein, for example pyrolysis reactions systems 30, 100, 180 or 700 described with reference to FIGS. 2, 8, 9 and 15 respectively.

Biosolids feedstock 1020 is pyrolysed in chamber 802 in the presence of inert gas 812, which consists of recycled combustion flue gas 814 during steady-state operation. Biochar product 820 is discharged from the pyrolysis chamber. The mixture of gas 812 and the produced pyrolysis gas flows through partition 834 into combustion reactor 830, where the pyrolysis gas is combusted in the presence of air 840. Air 840 is preheated by heat exchanger 856 (using the heat in combustion flue gas 814) and/or by pre-combustion in burner 1022 with natural gas 1024 (for example during start-up). The heat of combustion in reactor 830 flows efficiently into chamber 802, thus driving the pyrolysis reaction as described herein. Hot flue gas 814, with low $O_2$ content due to combustion, passes through heat exchanger 856 and a portion is recycled to form inert gas 812. A second portion is sent to wet/dry scrubber 1026 and bag filter/activated carbon bed 1028 for purification, and then vented via exhaust 1030.

The biochar produced in this process may advantageously be free of pathogens and microplastics present in the biosolids, and certain other contaminants, such as heavy metals and per- and polyfluoroalkyl substances (PFAS), may be destroyed, removed or immobilised in the biochar. The biochar may have excellent properties, for example one or more of favourably slow release of phosphorous when added to soils, high surface area, cation exchange capacity, oxygen containing functional groups and desirable pH due to the temperature control during pyrolysis.

EXAMPLES

The present invention is described with reference to the following examples. It is to be understood that the examples are illustrative of and not limiting to the invention described herein.

Example 1

The pyrolysis of biosolids (40 g), fluidised in $N_2$ (1 litre/min), was investigated at a range of temperatures. The morphology of the biochar was found to be strongly dependent on the temperature of pyrolysis. FIGS. 17, 18, 19, 20 and 21 depict scanning electron microscopy (SEM) images of biochar particles after isothermal pyrolysis at 500° C., 600° C., 700° C., 800° C. and 900° C. respectively. At 500° C., a low porosity biochar is produced. The porosity increases to a maximum at 700° C. At higher temperatures, the porosity drops again as a result of sintering.

The results demonstrate the importance of excellent heat transfer, and thus temperature control, in pyrolysis reactions. Poor heat transfer will result in uneven temperature distributions, potentially including reactions zones of sub-optimally low or high temperatures. As a result, both the reaction rate and quality of the biochar may be negatively affected.

Example 2

Figure 22:
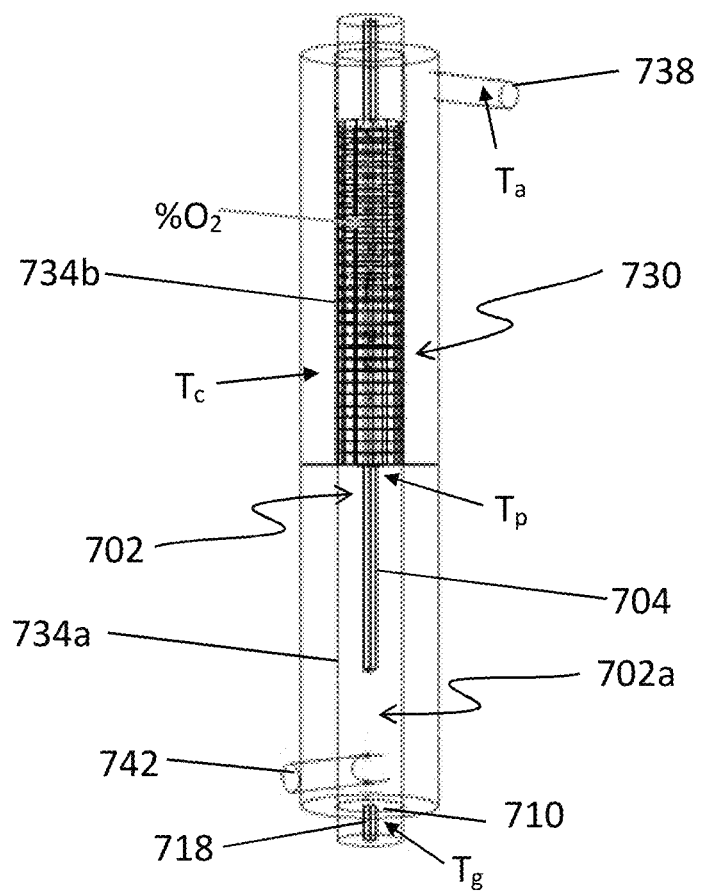
FIG. 22 depicts the design of a pyrolysis reactor system as modelled in Example 2 and operated in a demonstration-scale integrated pyrolysis and combustion process in Example 3.

A pyrolysis-combustion demonstration system, as schematically depicted in FIG. 22, was designed and modelled using computational fluid dynamics simulations. The system included cylindrical pyrolysis chamber 702 and annular combustion reactor 730, separated by a cylindrical partition which included lower impermeable portion 734a and upper mesh portion 734b. The mesh portion was formed with metallic mesh having 90% opening by area. Feed inlet pipe 704 was provided to introduce pyrolysable feedstock to fluidisation zone 702a at the bottom of the pyrolysis chamber, and gas inlet 710 to provide pre-heated inert gas ($N_2$), of controllable temperature, to fluidise the solids in fluidization zone 702a. Outlet 710 was provided to remove solid pyrolysis product. In the combustion reactor, air inlet 738 provided injection of pre-heated air, of controllable temperature, tangentially to the top of the combustion reactor, with combustion flue gas withdrawn from duct 742 at the bottom of the reactor.

Figure 23A:
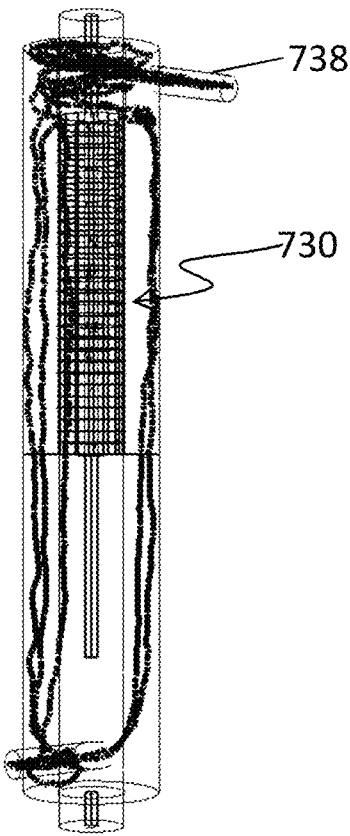
FIGS. 23A-23C depict the flow and mixing of inert gas, introduced to the pyrolysis chamber, and air, introduced to the combustion reactor, in the pyrolysis reactor system depicted in FIG. 22, as modelled with computational fluid dynamics simulations.
Figure 23B:
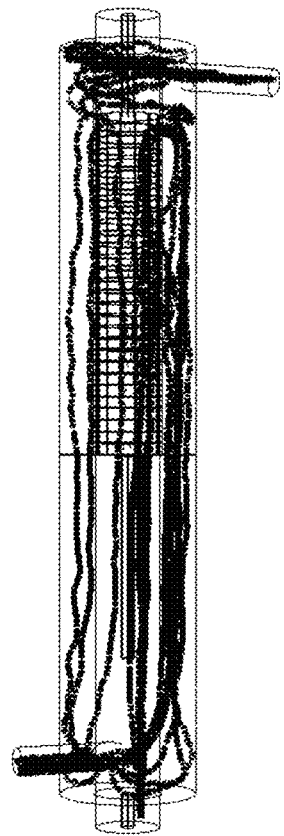
Figure 23C:
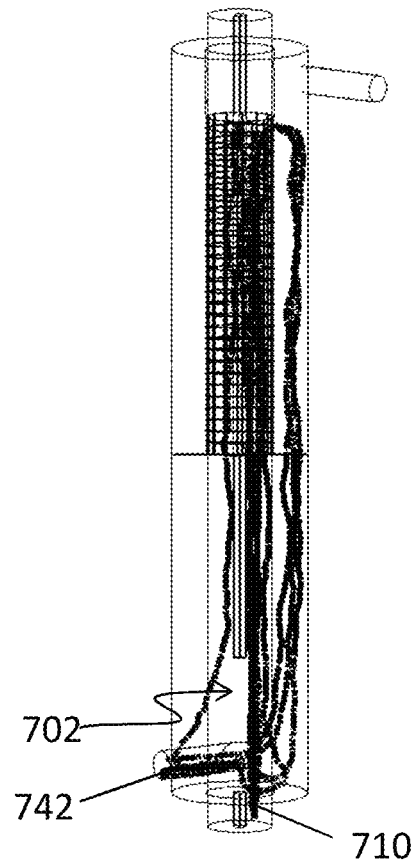

The flow of air, inert gas, and the mixing thereof during pyrolysis/combustion was modelled, with the results depicted in FIGS. 23A-22A using representative flow pathlines. In the simulation, inert gas (500° C.) was introduced at 110 litre/min, air (500° C.) was introduced at 40 litre/min, and biosolid was introduced at 0.25 kg/hour. As seen in in FIG. 23A, air injected tangentially into combustion reactor 730 through port 738 resulted in a cyclonic flow near the top of the reactor, with subsequent downward flow of air concentrated along the outer walls of the annular combustion reactor. As seen in FIG. 23C, inert gas introduced via inlet 710 flowed out of the pyrolysis chamber through the apertures in the mesh partition (only pathlines through upper apertures shown), and out of the combustion reactor via duct 742. The pressure in the pyrolysis chamber was sufficiently high that the inert gas, carrying combustible pyrolysis gas with it, and the air mixed only in the combustion reactor, as seen in FIG. 23B. Most of the mixing occurred near the outer walls of the combustion reactor. Thus, there little or no ingress of air into the pyrolysis chamber is expected.

Example 3

A pilot-scale demonstration unit was constructed according to the design depicted in FIG. 22 and described in Example 2. The temperatures of the inert gas ($T_g$), feed air ($T_a$), pyrolysis reaction zone ($T_p$) and combustion reaction zone ($T_a$) were measured with thermocouples at the locations indicated in FIG. 22. The $O_2$ content (% $O_2$) in the pyrolysis chamber was measured with an online oxygen analyser at the indicated location.

Figure 24:
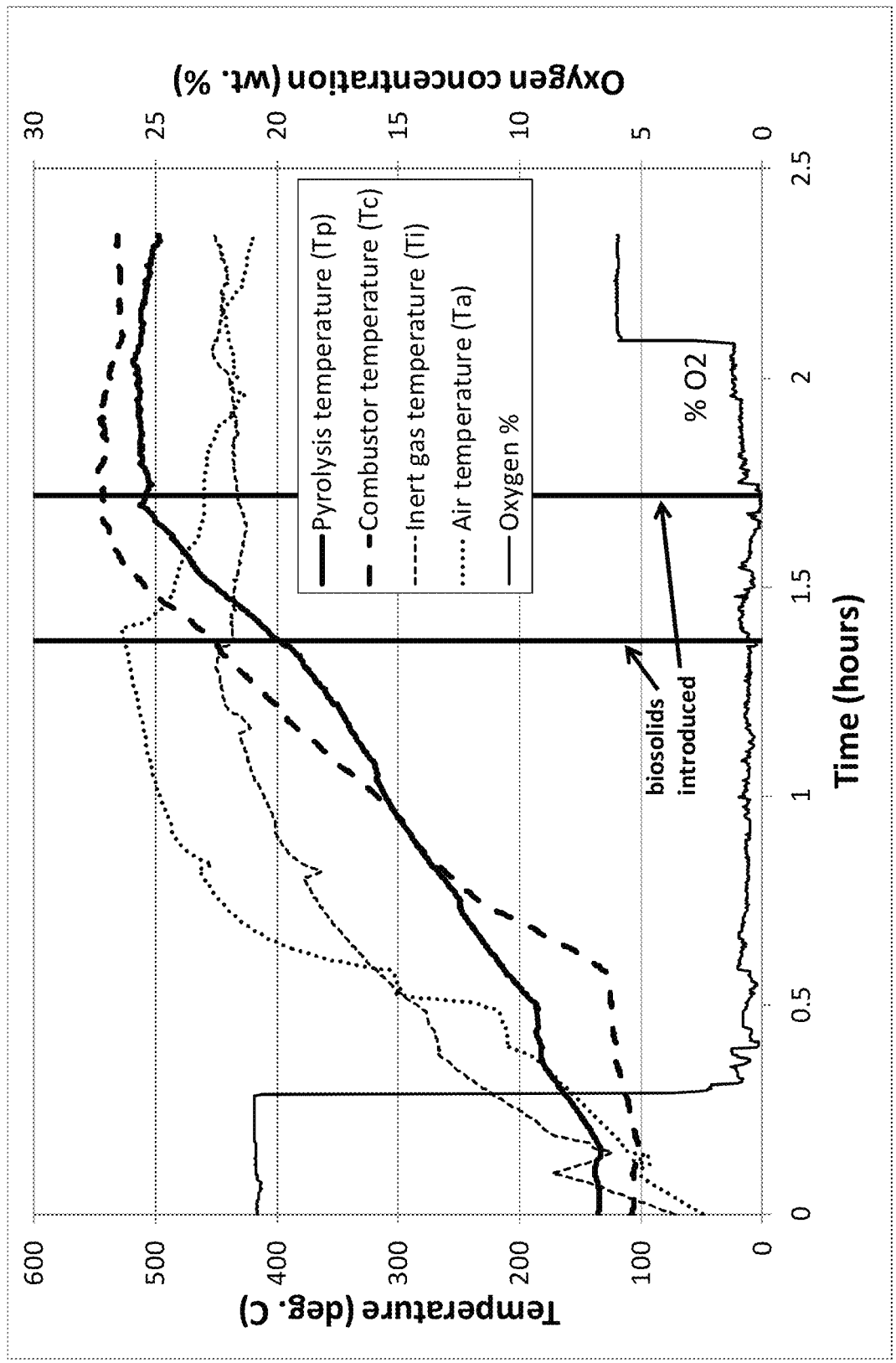
FIG. 24 is a graph of relevant process variables measured during the course of the demonstration-scale integrated pyrolysis and combustion process in Example 3.

A demonstration run was conducted using biosolids, obtained from South-East Water's Mount Martha plant and dried to a solids content of approximately 80 wt %, as pyrolysable feedstock. The particle size was c.a. 0.05 to 0.4 mm. The inert gas ($N_2/CO_2$ mixture) and air feeds were pre-heated using an LPG burner. Batches of biosolids feed (500 g and 200 g respectively) were introduced at 1.37 and 1.72 hours on line. No biochar product was withdrawn during the run. The results are shown in FIG. 24.

Initially, the temperatures of the pyrolysis chamber and combustion reactor were increased by raising the temperatures of the inert gas and air feeds respectively. The $O_2$ content in the pyrolysis chamber rapidly decreased to below 1 wt %, indicating that a satisfactory reducing environment for pyrolysis reactions was obtained in the pyrolysis chamber despite the mesh partition. When the temperature inside the pyrolysis chamber reached a desired operating temperature, the inert gas flow rate was set to the minimum flow rate needed for fluidisation, and the air flow rate was set according to energy balance calculations. The pressure of the inert feed gas, before the fluidisation distributor plate, was 1.5 kPa. The pressure measured in the pyrolysis chamber, directly above the fluidisation zone, was 1.2 kPa, and the measured pressure in the combustion reactor, close to the mesh partition, was 1.1 kPa.

A first batch of biosolids was introduced and fluidised in the inert gas flow. The temperature in the combustion reactor ($T_c$) then continued increasing even as the air feed temperature ($T_a$) was decreased, and $T_c$ exceeded $T_a$ for the remainder of the run. This indicates that exothermic reaction, i.e. combustion of pyrolysis gases originating from the pyrolysis chamber, was taking place inside the combustion reactor. The temperature in the pyrolysis chamber ($T_p$) also continued rising, despite the endothermic pyrolysis reaction and maintenance of a constant inert gas feed temperature ($T_g$). This indicates that heat of combustion was efficiently conveyed into the pyrolysis chamber to drive the endothermic pyrolysis reaction therein. The $O_2$ content in the pyrolysis chamber remained low (below 1.2 wt %) during the pyrolysis reaction (after 2.09 hours on line the $O_2$ analyser was used to measure the $O_2$ content in the combustion flue gas). A second batch of biosolids was added when the temperature inside the pyrolysis chamber reached 500° C., and this temperature was maintained at steady state for the remainder of the run by regulating the air flowrate.

A number of similar reactions were conducted with different pyrolysis target temperatures. Biochar yields were generally in the range of 30 to 40%. The measured surface area of the biochar was found to be 41, 53 and 66 $m^2/g$ at pyrolysis temperatures of 500° C., 550° C. and 600° C. respectively.

Those skilled in the art will appreciate that the invention described herein is susceptible to variations and modifications other than those specifically described. It is understood that the invention includes all such variations and modifications which fall within the spirit and scope of the present invention.

Future patent applications may be filed in Australia or overseas on the basis of or claiming priority from the present application. It is to be understood that the following provisional claims are provided by way of example only, and are not intended to limit the scope of what may be claimed in any such future application. Features may be added to or omitted from the provisional claims at a later date so as to further define or re-define the invention or inventions.

The invention claimed is:

1. A pyrolysis reaction system, the system comprising:
   a pyrolysis chamber comprising a feed inlet, a gas inlet and a product outlet, wherein the pyrolysis chamber is configured i) to receive a pyrolysable organic feed and an inert gas via the feed inlet and gas inlet respectively, ii) to pyrolyse the organic feed at a pyrolysis temperature to produce a carbonaceous pyrolysis product and a pyrolysis gas, wherein the pyrolysis gas will combine with the inert gas in use to form a gas mixture having a pyrolysis chamber pressure in the pyrolysis chamber, and iii) to discharge the carbonaceous pyrolysis product via the product outlet;
   a gas reactor configured to react the pyrolysis gas by combustion at a gas reaction temperature and a gas reactor pressure; and
   a first partition defining a boundary between the pyrolysis chamber and the gas reactor, the first partition comprising a plurality of first apertures to provide fluid communication between the pyrolysis chamber and the gas reactor,
   wherein the pyrolysis reaction system is operable with the gas reactor pressure less than the pyrolysis chamber pressure such that the gas mixture flows from the pyrolysis chamber to the gas reactor through the first apertures, thereby providing at least a portion of the pyrolysis gas for reaction in the gas reactor,
   wherein the pyrolysis reaction system is configured to transfer heat by convection and/or conduction from the gas reactor to the pyrolysis chamber through the first partition when the gas reaction temperature is greater than the pyrolysis temperature in operation,
   wherein the first partition is configured to exclude solids from the gas mixture flowing from the pyrolysis chamber to the gas reactor through the first apertures,
   wherein the gas reactor comprises a port for introducing a gas containing oxygen and a duct for removing flue gas, wherein the gas reactor is configured such that in operation the pyrolysis gas reacts by combustion with the oxygen, and
   wherein the gas reactor comprises an annulus surrounding the pyrolysis chamber and the port is configured to introduce the gas containing oxygen tangentially into the gas reactor such that a vortex flow around the pyrolysis chamber is produced in at least a part of the annulus.

2. The pyrolysis reaction system according to claim 1, wherein the partition is configured such that in operation the gas mixture flows through the first apertures at a flow rate sufficient to substantially preclude ingress of gas from the gas reactor into the pyrolysis chamber.

3. The pyrolysis reaction system according to claim 1, wherein the first partition comprises a mesh or perforated screen.

4. The pyrolysis reaction system according to claim 1, wherein the partition is configured such that heat convects from the gas reactor to the pyrolysis chamber through the first apertures when the gas reaction temperature is greater than the pyrolysis temperature in operation, thereby providing at least a portion of the heat of pyrolysis in the pyrolysis chamber.

5. The pyrolysis reaction system according to claim 4, wherein the first partition comprises a thermally conductive material such that heat conducts from the gas reactor to the pyrolysis chamber through the thermally conductive material when the gas reaction temperature is greater than the pyrolysis temperature in operation, thereby providing another portion of the heat of pyrolysis in the pyrolysis chamber.

6. The pyrolysis reaction system according to claim 1, wherein:
   the partition comprises a plurality of protruding members that extend into the gas reactor and/or the pyrolysis chamber, wherein at least a fraction of the first apertures are located on the protruding members.

7. The pyrolysis reaction system according to claim 6, wherein the protruding members are selected from tubes, fins and bubble caps.

8. The pyrolysis reaction system according to claim 6, wherein the protruding members incline upwardly from the pyrolysis chamber to the gas reactor.

9. The pyrolysis reaction system according to claim 1, wherein the pyrolysis chamber is configured to fluidise solids comprising the organic feed and/or the carbonaceous pyrolysis product with the inert gas.

10. The pyrolysis reaction system according to claim 9, wherein the pyrolysis chamber comprises a fluidisation zone and the apertures in the partition are located above the fluidisation zone.

11. The pyrolysis reaction system according to claim 1, configured to direct flue gas produced by combustion of the pyrolysis gas in the pyrolysis reaction system is to form at least a portion of the inert gas.

12. The pyrolysis reaction system according to claim 1, wherein the partition comprises a plurality of spaced apart sheet members that extend at least partially in a transverse orientation between the gas reactor and the pyrolysis chamber, wherein at least a fraction of the first apertures are located between the spaced apart sheet members.

13. The pyrolysis reaction system according to claim 12, wherein the spaced apart sheet members are selected from plates and meshes.

14. The pyrolysis reaction system according to claim 12, wherein the spaced apart sheet members incline upwardly from the pyrolysis chamber to the gas reactor.

15. A method of pyrolysing an organic feed, the method comprising:
   feeding a pyrolysable organic feed and an inert gas to a pyrolysis chamber;
   pyrolysing the organic feed at a pyrolysis temperature to produce a carbonaceous pyrolysis product and a pyrolysis gas, wherein the pyrolysis gas combines with the inert gas in the pyrolysis chamber to form a gas mixture having a pyrolysis chamber pressure;
   discharging the carbonaceous pyrolysis product from the pyrolysis chamber;
   flowing the gas mixture to a gas reactor through a plurality of first apertures in a first partition, wherein the first partition defines a boundary between the pyrolysis chamber and the gas reactor and wherein the first partition is configured to exclude solids from the gas mixture flowing from the pyrolysis chamber to the gas reactor through the first apertures;
   introducing a gas containing oxygen into the gas reactor via a port;
   reacting the pyrolysis gas with oxygen in the gas reactor by combustion at a gas reaction temperature and a gas reactor pressure, wherein the gas reactor pressure is less than the pyrolysis chamber pressure and the gas reaction temperature is greater than the pyrolysis temperature;
   removing flue gas from the gas reactor via a duct; and transferring heat by convection and/or conduction from the gas reactor to the pyrolysis chamber through the first partition to provide the heat of pyrolysis in the pyrolysis chamber, wherein the gas reactor comprises an annulus surrounding the pyrolysis chamber and the port is configured to introduce the gas containing oxygen tangentially into the gas reactor such that a vortex flow around the pyrolysis chamber is produced in at least a part of the annulus.

16. The method according to claim 15, wherein heat convects from the gas reactor to the pyrolysis chamber through the first apertures, thereby providing at least a portion of the heat of pyrolysis in the pyrolysis chamber.

17. The method according to claim 15, wherein:
i) the partition comprises a plurality of protruding members that extend into the gas reactor and/or the pyrolysis chamber, wherein at least a fraction of the first apertures are located on the protruding members; and/or
ii) the partition comprises a plurality of spaced apart sheet members that extend at least partially in a transverse orientation between the gas reactor and the pyrolysis chamber, wherein at least a fraction of the first apertures are located between the spaced apart sheet members.

18. The method according to claim 15, wherein the gas mixture flows through the first apertures at a flow rate sufficient to substantially preclude ingress of a gas from the gas reactor into the pyrolysis chamber.

19. The method according to claim 15, wherein pyrolysing the organic feed comprises fluidising solids comprising the organic feed and/or the carbonaceous pyrolysis product with the inert gas.

20. The method according to claim 15, wherein the pyrolysable organic feed comprises biosolids.

* * * * *